(12) United States Patent
Dawkins et al.

(10) Patent No.: US 11,010,084 B2
(45) Date of Patent: May 18, 2021

(54) VIRTUAL MACHINE MIGRATION SYSTEM

(71) Applicant: Dell Products L.P., Round Rock, TX (US)

(72) Inventors: William Price Dawkins, Lakeway, TX (US); Kurtis John Bowman, Austin, TX (US); Dragan M. Savic, Brookline, MA (US); Shyamkumar T. Iyer, Austin, TX (US); Jimmy Doyle Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 16/403,134

(22) Filed: May 3, 2019

(65) Prior Publication Data

US 2020/0348873 A1 Nov. 5, 2020

(51) Int. Cl.
*G06F 12/00* (2006.01)
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/067* (2013.01); *G06F 3/0659* (2013.01); *G06F 3/0664* (2013.01); *G06F 9/45558* (2013.01); *G06F 2009/4557* (2013.01); *G06F 2009/45583* (2013.01)

(58) Field of Classification Search
CPC .... G06F 3/0647; G06F 3/0604; G06F 3/0659; G06F 3/0664; G06F 3/067; G06F 9/45558; G06F 2009/4557; G06F 2009/45583
See application file for complete search history.

(56) References Cited

U.S. PATENT DOCUMENTS

| 7,484,208 | B1 | | 1/2009 | Nelson | |
|---|---|---|---|---|---|
| 9,417,812 | B1 | * | 8/2016 | Palekar | G06F 3/0617 |
| 9,880,870 | B1 | * | 1/2018 | Danilov | G06F 9/45558 |
| 2011/0099318 | A1 | * | 4/2011 | Hudzia | G06F 9/5088 |
| | | | | | 711/6 |
| 2012/0054410 | A1 | * | 3/2012 | Vaghani | G06F 12/08 |
| | | | | | 711/6 |
| 2012/0137285 | A1 | * | 5/2012 | Glikson | G06F 9/4856 |
| | | | | | 718/1 |
| 2012/0173653 | A1 | * | 7/2012 | Bland | G06F 9/4856 |
| | | | | | 709/213 |

(Continued)

*Primary Examiner* — Prasith Thammavong
(74) *Attorney, Agent, or Firm* — Haynes and Boone, LLP

(57) ABSTRACT

A virtual machine migration system that includes an initiator host that provides a virtual machine and receives an instruction to migrate the virtual machine to the target host. The initiator host moves, while the virtual machine is operating on the initiator host, virtual machine data for the virtual machine from a local memory area in a local memory system to a memory fabric memory area in a memory fabric memory system. A first portion of the virtual machine data in the local memory area and a second portion of the virtual machine data in the memory fabric memory area are accessible to the virtual machine and the initiator host during the movement of the virtual machine data. The initiator host stops, in response to all the virtual machine data being moved to the memory fabric memory area, operation of the virtual machine on the initiator host.

20 Claims, 16 Drawing Sheets

(56) References Cited

U.S. PATENT DOCUMENTS

| | | | |
|---|---|---|---|
| 2013/0339527 A1* | 12/2013 | Chowdhry | H04L 41/5009 709/226 |
| 2014/0075047 A1* | 3/2014 | Narasimhan | G06F 11/203 709/238 |
| 2014/0169214 A1* | 6/2014 | Nakajima | H04L 67/1097 370/254 |
| 2014/0297979 A1* | 10/2014 | Baron | G06F 3/0614 711/162 |
| 2015/0378766 A1 | 12/2015 | Beveridge et al. | |
| 2016/0246631 A1* | 8/2016 | Tsirkin | G06F 9/45558 |
| 2017/0255487 A1* | 9/2017 | Tsuji | G06F 9/4856 |
| 2017/0324645 A1* | 11/2017 | Johnsen | H04L 47/20 |
| 2017/0339008 A1* | 11/2017 | Dion | G06F 9/5072 |
| 2017/0364394 A1* | 12/2017 | Fujita | G06F 9/4856 |
| 2018/0052701 A1* | 2/2018 | Kaplan | G06F 9/45558 |
| 2018/0314450 A1* | 11/2018 | Qiu | G06F 3/061 |
| 2019/0286475 A1* | 9/2019 | Mani | G06F 9/4856 |
| 2019/0294462 A1* | 9/2019 | Franciosi | G06F 9/45533 |

* cited by examiner

VIRTUAL MACHINE MIGRATION SYSTEM

BACKGROUND

The present disclosure relates generally to information handling systems, and more particularly to migrating virtual machines provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, server devices, are sometimes utilized to provide virtual machines, which one of skill in the art will recognize are emulations of computer systems that are based on computer architectures, and that provides the functionality of physical computer systems. For example, virtual machines may provide the functionality needed to execute entire operating systems, with a hypervisor in the server device utilizing native execution to share and manage hardware in the server device, allowing for the provisioning of multiple environments which are isolated from each other while also being provided on the same server device. Virtual machines may be deployed on server devices when they are needed, and then removed from the server devices when they are no longer needed, which can result in a dynamic server device environment in which virtual machines are deployed and removed regularly while utilizing different resources in that server device over time. In some situations, it is beneficial to migrate a virtual machine operating on a server device to another server device. Examples of migrating a virtual machine to another server devices may include: migrating a virtual machine to a server device that may have more available hardware resources to deploy for the virtual machine relative to the server device currently providing that virtual machine, migrating a virtual machine because the server device providing that virtual machine is failing or experiencing performance issues, migrating a virtual machine because the server device providing that virtual machine requires maintenance or an upgrade that would interrupt the operation of the virtual machine, and/or other situations that would be apparent to one skill in the art in possession of the present disclosure.

Virtual machine migration is often carried out by a virtual machine management server (e.g., a server device that includes virtualization software such as VSPHERE® available from VMWARE® of Palo Alto, Calif., United States), and may include live virtual machine migration techniques where the virtual machine runs on a host server device until it is fully migrated to a target host server device. In a virtualization environment, virtual machine migration may include freezing the running virtual machine, taking a snapshot of the memory contents and copying that snapshot to a target host server device, and then unfreezing virtual machine. This process may be repeated periodically, with the differential between current memory contents in a current snapshot from previous memory contents in a previous snapshot copied to the target host server device, until the virtual machine management server determines that the differences between the virtual machine memory contents on the host server device and the target host server device are small enough that the virtual machine on the host server device may be frozen one last time, the final differences between the virtual machine memory contents on the host server device and the target host server device may be copied to the target host server device, and the virtual machine may be started on the target host server device. This process is both copy intensive and somewhat disruptive to the performance of the virtual machine while the migration is occurring.

Accordingly, it would be desirable to provide an improved virtual machine migration system

SUMMARY

According to one embodiment, an Information Handling System (IHS) includes a processing system; and a memory system that is coupled to the processing system and that includes instructions that, when executed by the processing system, cause the processing system to provide a hypervisor engine that is configured to: operate a first virtual machine on the processing system; receive a live virtual machine migration instruction to migrate the first virtual machine to a target host computing device; move, while the first virtual machine is operating on the processing system, first virtual machine data for the first virtual machine from a first local memory area in the memory system to a first memory fabric memory area in the memory fabric memory system, wherein a first portion of the first virtual machine data in the first local memory area in the memory system and a second portion of the first virtual machine data in the first memory fabric memory area in the memory fabric memory system are accessible to the first virtual machine during the movement of the first virtual machine data; and stop, in response to all of the first virtual machine data being moved to the first memory fabric memory area in the memory fabric memory system, operation of the first virtual machine on the processing system.

According to one embodiment, the stopping operation of the first virtual machine on the processing system causes the memory fabric memory system to: disassociate the first memory fabric memory area in the memory fabric memory system and the processing system; and associate the first memory fabric memory area in the memory fabric memory system with the target host computing device.

According to one embodiment, the disassociation of the first memory fabric memory area in the memory fabric memory system and the processing system and the association of the first memory fabric memory area in the memory fabric memory system with the target host computing device includes: changing page ownership that provides the target host computing device ownership of the first memory fabric memory area in the memory fabric memory system.

According to one embodiment, the hypervisor engine is configured to: receive a second virtual machine state of a second virtual machine; and operate, according to the second virtual machine state and using second virtual machine data stored in a second memory fabric memory area in the memory fabric memory system, a third virtual machine that is a migrated version of the second virtual machine that was on an initiator host computing device.

According to one embodiment, the hypervisor engine is configured to: move the second virtual machine data from the second memory fabric memory area in the memory fabric memory system to a second local memory area in the memory system, wherein a first portion of the second virtual machine data in the second memory fabric memory area in the memory fabric memory system and a second portion of the second virtual machine data in the second local memory area in the memory system are accessible to the third virtual machine and the processing system during the movement of the second virtual machine data from the second memory fabric memory area in the memory fabric memory system to the second local memory area in the memory system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
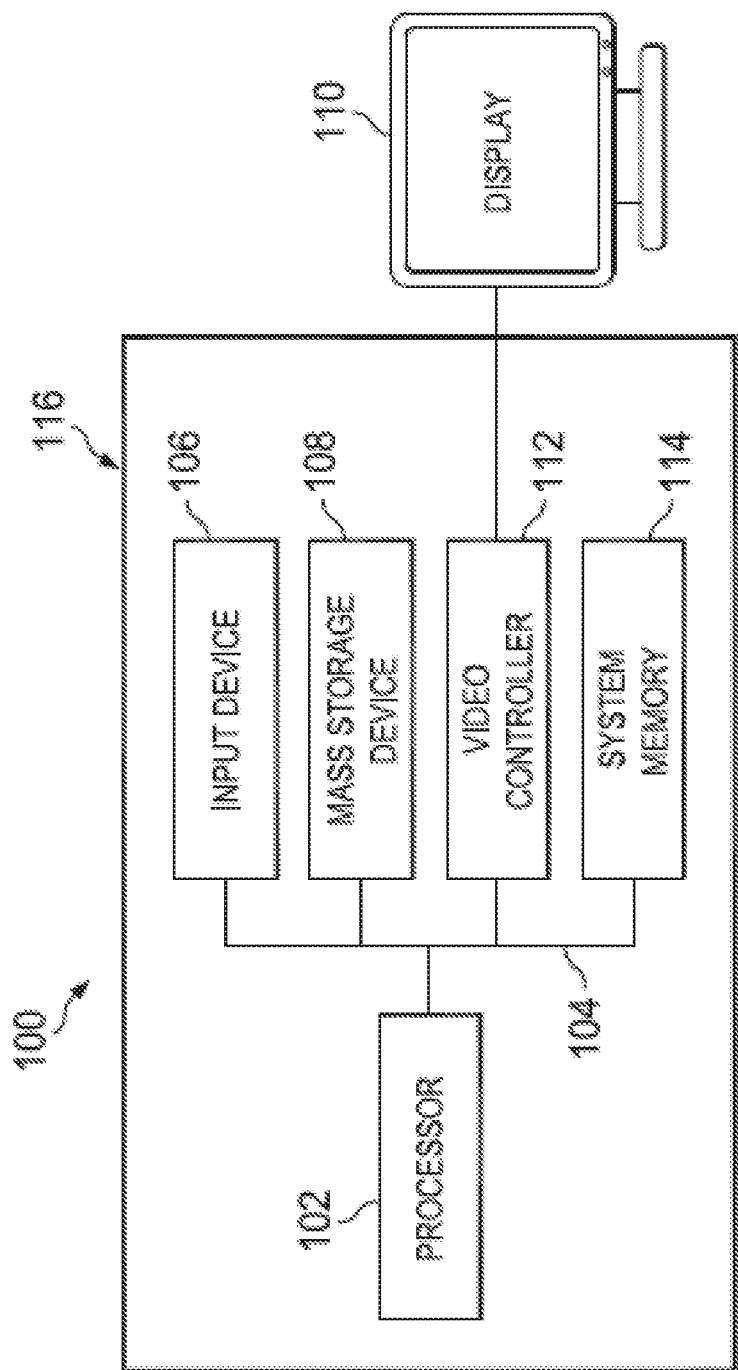
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
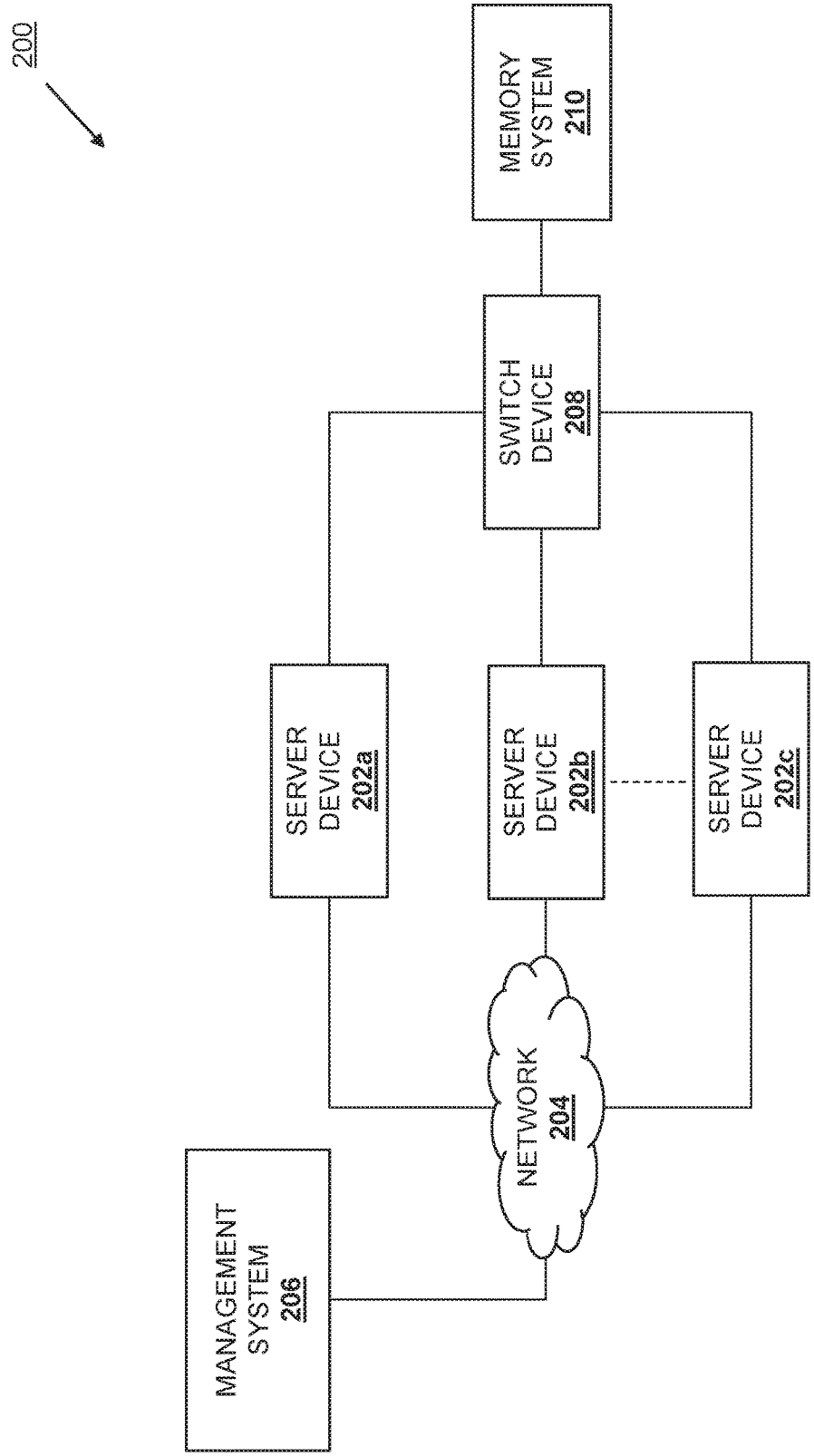
FIG. 2 is a schematic view illustrating an embodiment of a networked system.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-c may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202*a-c* provided in the networked system 200 may include any devices that may be configured to operate similarly as discussed below. While only three server devices 202*a-c* are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202*a-c* are each coupled to a network 204 that is included in the networked system 200 and that may be provided by, for example, a Local Area Network (LAN), the Internet, and/or any other network (or combination of networks) that would be apparent to one of skill in the art in possession of the present disclosure. Furthermore, the illustrated embodiment the networked system 200 includes a management system 206 that is coupled to the server devices 202*a-c* via the network 204. In an embodiment, the management system 206 may be provided by the IHS 100 discussed above with reference to FIG. 1, and/or may include some or all of the components of the IHS 100. In specific examples, the management system 206 may be provided by server devices, desktop computing devices, laptop/notebook computing devices, tablet computing devices, mobile phones, and/or any other device that may provide the management system functionality discussed below.

In the Illustrated embodiment, the server devices 202*a-c* are each coupled to a switch device 208 (e.g., that is included as part of the network 204 or a separate network). In an embodiment, the switch device 208 may be provided by the IHS 100 discussed above with reference to FIG. 1, and/or may include some or all of the components of the IHS 100. In a specific example, the switch device 208 may be provided by a Gen-Z switch device that has been configured to provide the virtual machine migration functionality discussed below. While discussed herein as being a switch device, one of skill in the art in possession of the present disclosure will recognize that the switch device 208 may be replaced with a bridge device and/or other devices with similar functionality while remaining within the scope of the present disclosure as well. Furthermore, the illustrated embodiment of the networked system 200 includes a memory system 210 that is coupled to the server devices 202*a*, 202*b*, and 202*c* via the switch device 208. In an embodiment, the memory system 210 may be provided by the IHS 100 discussed above with reference to FIG. 1, and/or may include some or all of the components of the IHS 100. In specific examples, the memory system 210 may be provided by one or more separate server devices, as a logical portion of one or more of the server devices 202*a*, 202*b*, and/or 202*c*, and/or in a variety of other manners that would be apparent to one of skill in the art in possession of the present disclosure. In the embodiments discussed below, the memory system 210 provides a network-connected memory fabric that may be utilized by any of the server devices 202*a*, 202*b*, and 202*c* via the switch device 208.

For example, the network-connected memory fabric may be a Gen-Z memory fabric created and commercialized by the Gen-Z consortium, and which one of skill in the art in possession of the present disclosure will recognize extends the processing system/memory system byte-addressable load/store model to the entire networked system 200 by decoupling the processing system/compute functionality in the server devices 202*a*-202*c* from the memory system/media functionality in the memory system 210, allowing processing systems and memory system to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, the server devices 202*a*-202*c* are illustrated as each coupled to the memory system 210 via the switch device 208, one of skill in the art in possession of the present disclosure will recognize that in other embodiments the switch device 208 and the memory system 210 may be provided in a server device to enable the functionality described below while remaining within the scope of the present disclosure as well. As such, while a specific networked system 200 has been illustrated and described, one of skill in the art in possession of the present disclosure will recognize that the virtual machine migration system of the present disclosure may utilize a variety of other components and component configurations while remaining within the scope of the present disclosure as well.

Figure 3:
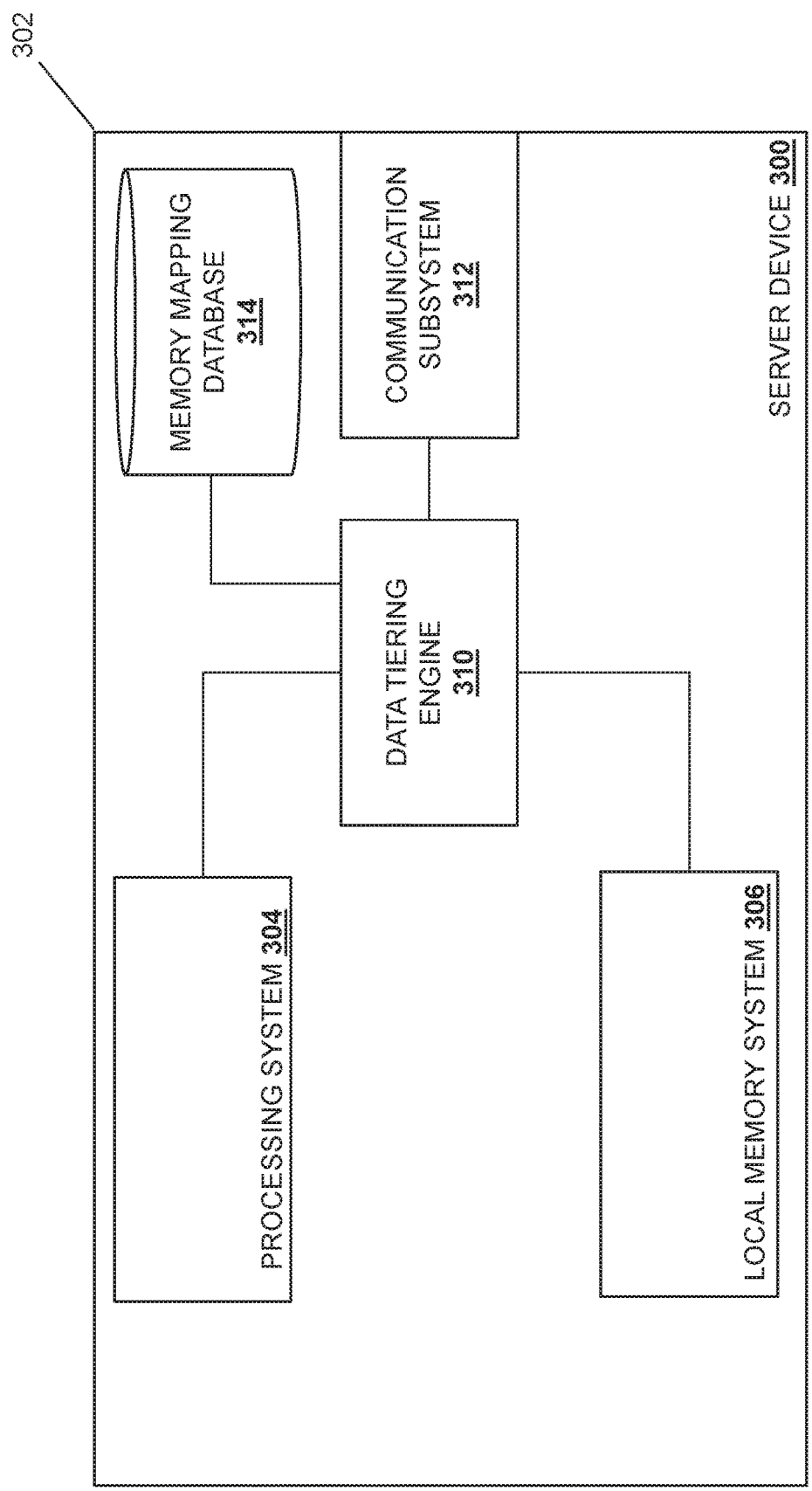
FIG. 3 is a schematic view illustrating an embodiment of a server device that may be included in the networked system of FIG. 2

Referring now to FIG. 3, an embodiment of a server device 300 is illustrated that may provide any of the server devices 202*a-c* discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. In the illustrated embodiment, the server device 300 includes a chassis 302 that houses the components of the server device 300, only some of which are discussed below.

For example and as illustrated in FIG. 3, the chassis 302 may house a processing system 304. In some embodiments, the processing system 304 may be provided by Central Processing Unit (CPU) devices, System-on-Chip (SOC) devices, and/or other processing systems that do not include a media controller device (which, as discussed below, may be provided in the memory fabric memory system utilized by the processing system(s).) Furthermore, the processing system 304 may be coupled to one or more local memory systems 306 that are provided in the server device 300 and that include instructions that, when executed by the processing system 304 allow the processing system 304 to perform any of the functionality discussed below (e.g., the provisioning of virtual machines, applications, threads, data mover engine(s), etc.).

In another example, the chassis 302 may house a virtual machine migration processing system (not illustrated, but which may include the processor 102 discussed above with reference to FIG. 1) and a virtual machine migration memory system (not illustrated, but which may include the memory 114 discussed above with reference to FIG. 1) that is coupled to the virtual machine migration processing system and that includes instructions that, when executed by the virtual machine migration processing system, cause the virtual machine migration processing system to provide a virtual machine migration engine (e.g., via virtual machine orchestration software and/or other virtualization software such as VSPHERE® available from VMWARE® of Palo Alto, Calif., United States) that is configured to perform the functionality of the virtual machine migration engines and/or virtual machine migration subsystems discussed below.

In a specific example, the virtual machine migration engine discussed below may be provided via an agent included in a hypervisor in the server device 300. The hypervisor in the server device 300 may also include a virtual machine deployment engine to deploy virtual machines on the server device 300. However, in other examples, the virtual machine migration engine and/or the virtual machine deployment engine discussed below may be provided via a system connected to the server device 300 (e.g., the management system 206 discussed above with reference to FIG. 2.) While a few examples of the provisioning of the virtual machine migration engine have been described, one of skill in the art in possession of the present disclosure will recognize that the virtual machine migration and deployment functionality discussed below may be enabled in a variety of manners and by a variety of devices or systems while remaining within the scope of the present disclosure as well.

In some embodiments, the chassis 302 may house a data tiering processing system (not illustrated, but which may include the processor 102 discussed above with reference to FIG. 1) and a data tiering memory system (not illustrated, but which may include the memory 114 discussed above with reference to FIG. 1) that is coupled to the data tiering processing system and that includes instructions that, when executed by the data tiering processing system, cause the data tiering processing system to provide a data tiering engine 310 that is configured to perform the functionality of the data tiering engines and/or server devices discussed below. In the illustrated embodiment, the data tiering engine 310 is illustrated as separate from the processing system 304 and, as such, may be provided by separate data tiering hardware and software (e.g., a Field Programmable Gate Array (FPGA) provided on a Peripheral Component Interconnect express (PCIe) card, and/or other subsystem known in the art) coupled to the processing system 304. However, in other embodiments, the data tiering engine 310 may be integrated with, included in, and/or otherwise part of the processing system 304 and/or the hypervisor. As such, in those embodiments, the data tiering engine 310 may be provided by instructions on a local memory system 306 in the server device 300 that may be executed by a CPU-independent processing subsystem in the processing system 304, provided as an FPGA that is part of the processing system 304, provided by the hypervisor, and/or provided in a variety of manners that would be apparent to one of skill in the art in possession of the present disclosure.

In some embodiments, in addition to the virtual machine migration operations discussed below, the data tiering engine 310 may be configured to perform read, write, copy, and/or other data movement operations for the processing system 304 (e.g., to the local memory system 306) in order to, for example, relieve the processing system 304 from having to use processing cycles to perform those operations. However, one of skill in the art in possession of the present disclosure will recognize that the functionality of the data tiering engine 310 discussed below may be provided by itself and/or with other functionality while remaining within the scope of the present disclosure as well. While a few examples of data tiering engine implementations and functionality have been described, one of skill in the art in possession of the present disclosure will recognize that a variety of different functionality for the data tiering engine 310 may be enabled in a variety of manners that will fall within the scope of the present disclosure as well.

In the illustrated embodiment, the chassis 302 also houses a communication subsystem 312 that is coupled to the data tiering engine 310 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. The chassis 302 may also house a storage system (not illustrated, but which may include the storage 108 discussed above with reference to FIG. 1) that is coupled to the data tiering engine 310 (e.g., via a coupling between the storage system and the data tiering processing system), and that includes a memory mapping database 314 that is configured to store any of the information (e.g., the memory fabric reference pointers, memory fabric page ownership information, virtual machine memory addresses to physical memory address mappings, etc.) utilized by the data tiering engine 310 discussed below. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
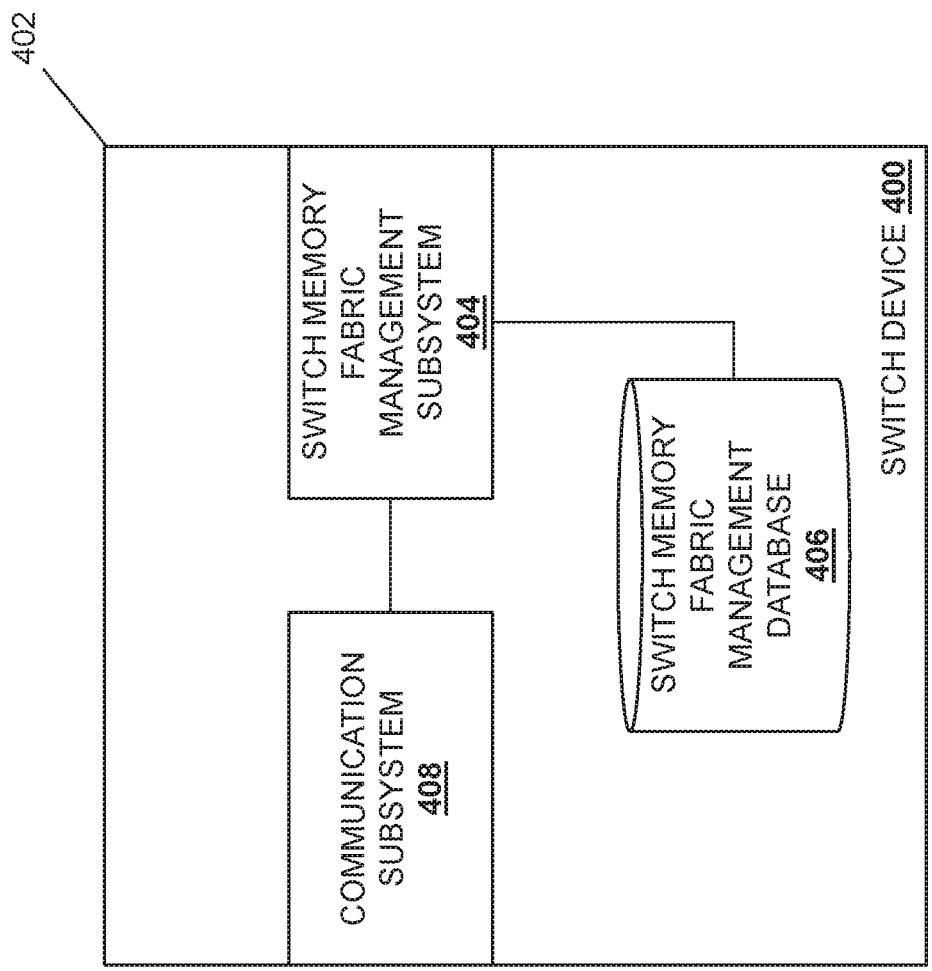
FIG. 4 is a schematic view illustrating an embodiment of a switch device that may be included in the networked system of FIG. 2.

Referring now to FIG. 4, an embodiment of a switch device 400 is illustrated that may provide the switch device 208 discussed above with reference to FIG. 2. As such, the switch device 400 may be provided by the IHS 100 discussed above with reference to FIG. 1 and/or may include some or all of the components of the IHS 100, and in specific examples may be provided by a Gen-Z switch device as discussed above. Furthermore, while illustrated and described as a switch device 400, one of skill in the art in possession of the present disclosure will recognize that the functionality of the switch device 400 discussed below may be provided by other devices (e.g., the bridge devices discussed above) that are configured to operate in a similar manner. In the illustrated embodiment, the switch device 400 includes a chassis 402 that houses the components of the switch device 400, only some of which are illustrated below. In the illustrated embodiment, the chassis 402 houses a memory fabric management subsystem 404 that is configured to provide memory fabric management operations for the switch device 400.

For example, when the memory fabric is a Gen-Z memory fabric as discussed above, the memory fabric management subsystem 404 may include a Gen-Z Memory Management Unit (Gen-Z ZMMU) that, in the example provided below, operates to enable access for the processing systems in the server devices 202a-202c of FIG. 2 to the Gen-Z memory fabric by augmenting Gen-Z ZMMU requester operations, and may operate to manage all the Gen-Z ZMMUs in the networked system 200. In some specific examples, the switch device 400 may operate to hide the hierarchy of Gen-Z ZMMUs behind it by, for example, operating as both a Gen-Z ZMMU requester and a Gen-Z ZMMU responder. As such, when the Gen-Z ZMMU(s) provided/managed by the switch device 400 have been programmed, each server device 202a-202c may discover Gen-Z memory fabric access (e.g., via a "Gen-Z aperture") during a boot process for that server device, and map ZMMU memory space aperture(s) into their system physical address space, while the Basic Input/Output System (BIOS), firmware, and/or operating system in each of those server devices may perform ZMMU address space discovery. Following that discovery, the operating system may implement a memory manager using a CPU MMU in order to allocate memory using MMU page size chunks for applications (i.e., the ZMMU aperture may be allocated by the memory fabric management subsystem 404, with the individual MMU pages allocated to the application(s) by operating systems in the server devices). However, one of skill in the art in possession of the present disclosure will recognize that other memory fabric management subsystems for other memory fabrics may be utilized with the teachings of the present disclosure while remaining within its scope as well.

The chassis 402 may also house a storage system (not illustrated, but which may include the storage 108 discussed above with reference to FIG. 1) that is coupled to the memory fabric management subsystem 404 (e.g., via a coupling between the storage system and the memory fabric management subsystem 404) and that includes a switch memory fabric management database 406 that is configured to store any of the information (e.g., the memory fabric reference pointers, memory fabric page ownership information, etc.) utilized by the memory fabric management subsystem 404 discussed below. In the illustrated embodiment, the chassis 402 also houses a communication subsystem 408 that is coupled to the memory fabric management subsystem 404 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. While a specific switch device 400 has been illustrated, one of skill in the art in possession of the present disclosure will recognize that switch devices (or other devices operating according to the teachings of the present disclosure in a manner similar to that described below for the switch device 400) may include a variety of components and/or component configurations for providing conventional switch device functionality, as well as the functionality discussed below, while remaining within the scope of the present disclosure as well.

Figure 5:
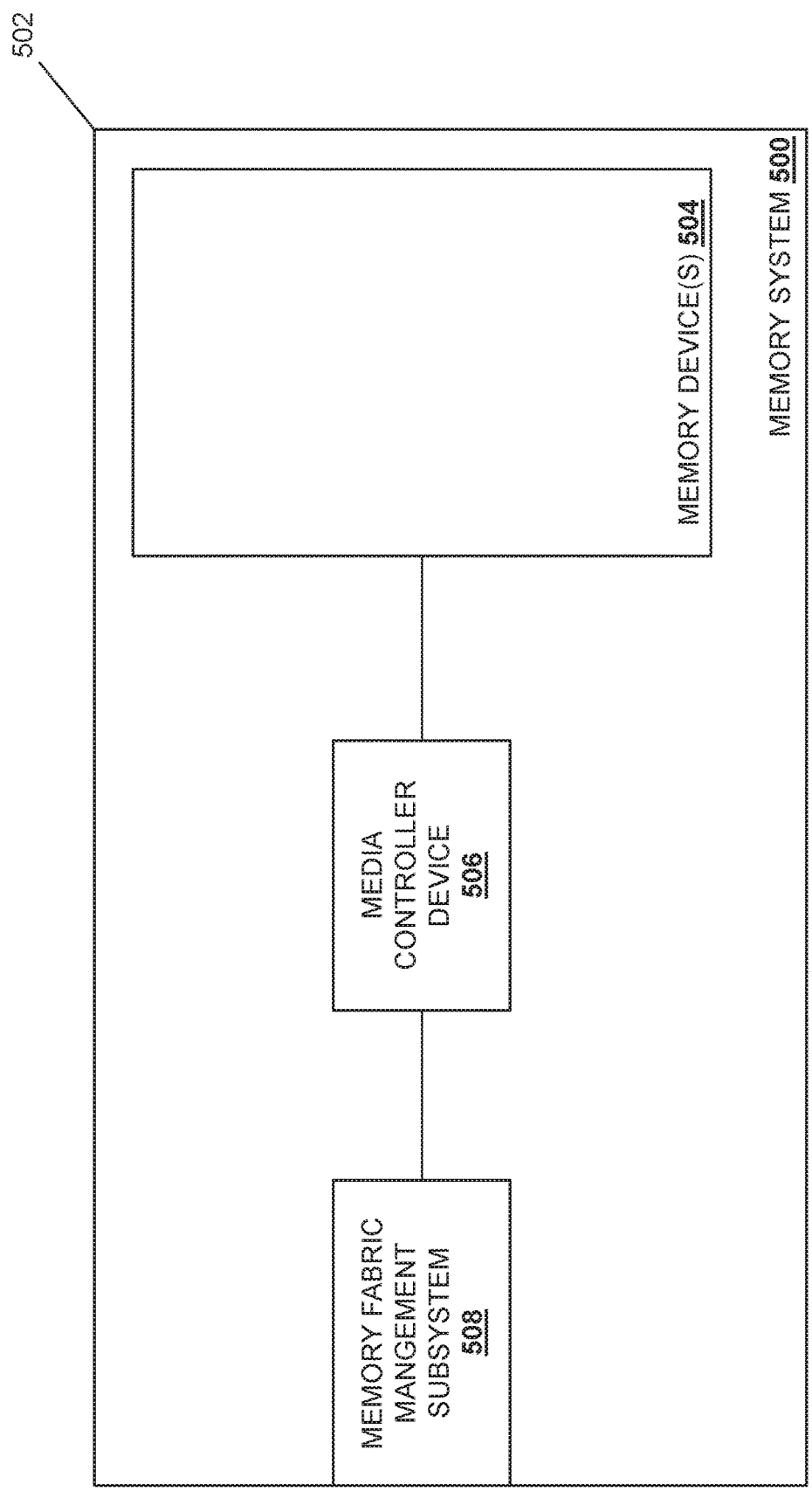
FIG. 5 is a schematic view illustrating an embodiment of a memory system that may be included in the networked system of FIG. 2.

Referring now to FIG. 5, an embodiment of a memory system 500 is illustrated that may provide memory system 210 discussed above with reference to FIG. 2. As such, the memory system may be provided by the IHS 100 discussed above with reference to FIG. 1 and/or may include some or all of the components of the IHS 100, and in specific examples may be provided by one or more separate server devices, one or more of the server devices 202a-202c, and/or in a variety of other manners that would be apparent to one of skill in the art in possession of the present disclosure. Furthermore, while illustrated and discussed as a memory system, one of skill in the art in possession of the present disclosure will recognize that the functionality of the memory system discussed below may be provided by other devices that are configured to operate similarly as discussed below. In the illustrated embodiment, the memory system 500 includes a chassis 502 that houses the components of the memory system 500, only some of which are illustrated below.

For example, the chassis 502 may house one or more memory devices 504 that may be provided by Dynamic Random-Access Memory (DRAM) devices, Storage Class Memory (SCM) devices, Solid State Drive (SSD) device arrays, and/or any other memory device that would be apparent to one of skill in the art in possession of the present disclosure. In the illustrated embodiment, the chassis 502 houses a media controller device 506 that is coupled to the memory device(s) 504. While illustrated as a single media controller device 506 coupled to one or more memory device(s) 504, one of skill in the art in possession of the present disclosure will recognize that multiple media controller devices may be provided for the memory device(s) 504 while remaining within the scope of the present disclosure as well. For example, a separate media controller device may be provided for each memory device technology (e.g., a first media controller device may be provided for DRAM devices, a second media controller device may be provided for SCM devices, etc.) However, while a few specific examples of memory devices and media controller devices have been provided, one of skill in the art in possession of the present disclosure will recognize that a wide variety of memory device and/or media controller device components and/or configurations will fall within the scope of the present disclosure as well.

In the illustrated embodiment, the chassis 502 houses a memory fabric management subsystem 508 that is configured to provide memory fabric management operations for the memory system 500. For example, when the memory fabric is a Gen-Z memory fabric as discussed above, the memory fabric management subsystem 508 may include a Gen-Z Memory Management Unit (Gen-Z ZMMU) that, in the example provided below, operates as a Gen-Z ZMMU responder that operates with Gen-Z ZMMU requester(s) that provide access for the processing systems in the server devices 202a-c to the Gen-Z memory fabric. However, one of skill in the art in possession of the present disclosure will recognize that other memory fabric management subsystems for other memory fabrics may be utilized with the teachings of the present disclosure while remaining within its scope as well. While a specific memory system 500 has been illustrated, one of skill in the art in possession of the present disclosure will recognize that memory systems (or other systems operating according to the teachings of the present disclosure in a manner similar to that described below for the memory system 500) may include a variety of components and/or component configurations for providing conventional memory system functionality, as well as the functionality discussed below, while remaining within the scope of the present disclosure as well.

Figure 6:
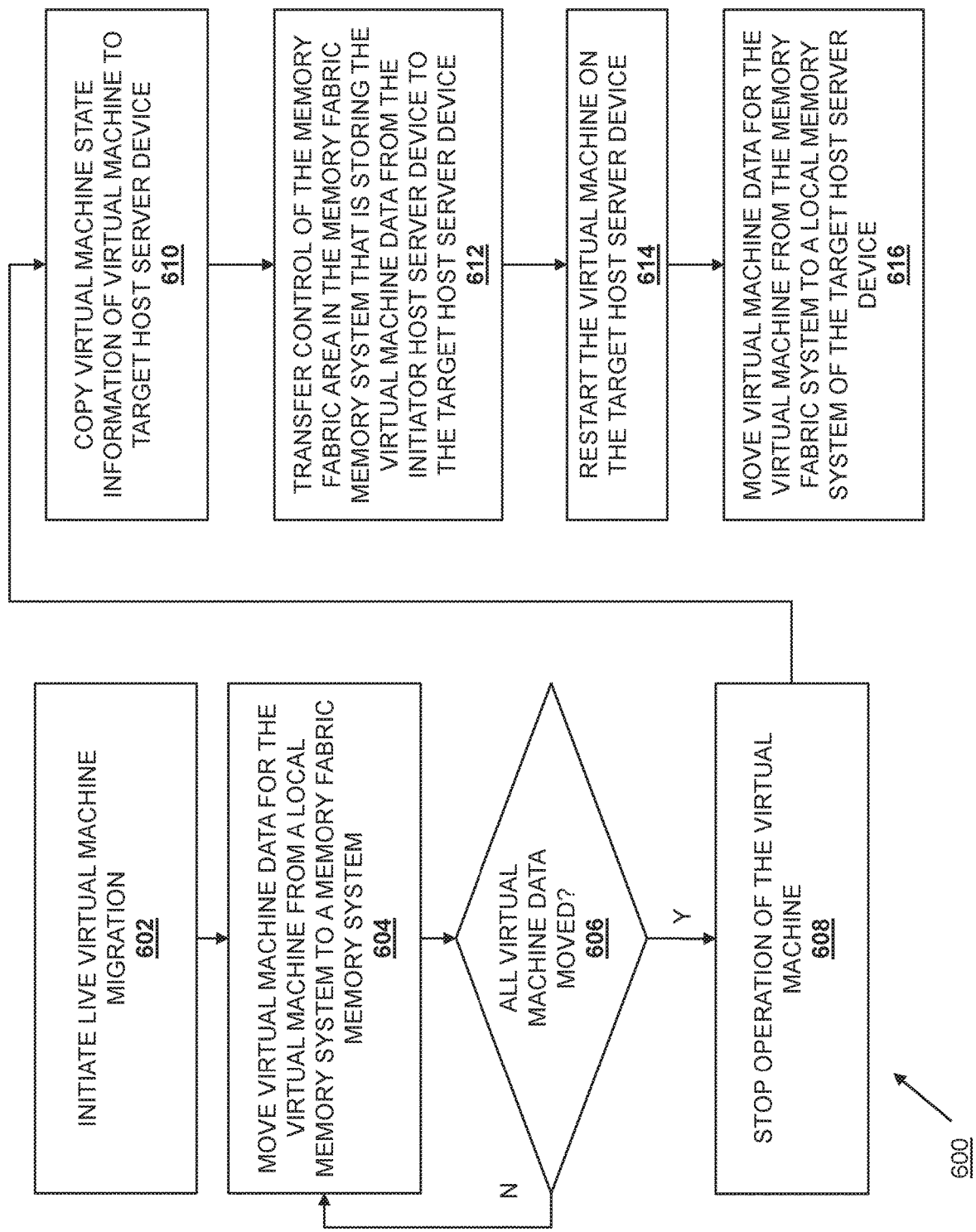
FIG. 6 is a flow chart illustrating an embodiment of a method for virtual machine migration.

Referring now to FIG. 6, an embodiment of a method 600 for migrating a virtual machine is illustrated. As discussed below, the systems and methods of the present disclosure provide live migration of a virtual machine deployed on an initiator host server device to a target host server device. A management system may initiate the live migration and cause a data tiering engine on the initiator host server device to begin moving, while the virtual machine is operating on the initiator host server device, virtual machine data associated with the virtual machine from a local memory area in a local memory system that is included in the initiator host server device to a memory fabric memory area in a memory fabric memory system. The data tiering engine may maintain a migration map of virtual-machine-memory-addresses-to-physical-memory-addresses in the first local memory area in the local memory system, and physical memory addresses in the memory fabric memory area in the memory fabric memory system, so that the virtual machine can access the virtual machine data in both memory systems, or so that the processing system can access the virtual machine data to provide the virtual machine in both memory systems. Once the data tiering engine completes transfer of the virtual machine data from the local memory area in the local memory system to the memory fabric memory area in the memory fabric memory system, the management system may stop the virtual machine deployed on the initiator host server device and copy virtual machine state information for the virtual machine to the target host server device.

A switch device may then modify notational reference information in a database in order to disassociate the memory fabric memory area in the memory fabric memory system from the initiator host server device, and associate the memory fabric memory area in the memory fabric memory system with the target host server device, which allows the target host server to reference that virtual machine data in the memory fabric memory system using request/respond operations. The virtual machine management server may then restart the virtual machine on the target host server using the virtual machine state information and the virtual machine data in the memory fabric memory area of the memory fabric memory system. Subsequently, a data tiering engine on the target host server device may transfer, while the virtual machine is running on the target host server device, the virtual machine data from the memory fabric memory area in the memory fabric memory system to a local memory area in a local memory system in the target host server. As such, a more efficient live virtual machine migration is provided that is less copy intensive and less disruptive to the virtual machine that is being migrated relative to conventional live virtual machine migration techniques that require that the virtual machine be halted several times before the live virtual machine migration is complete.

Figure 7A:
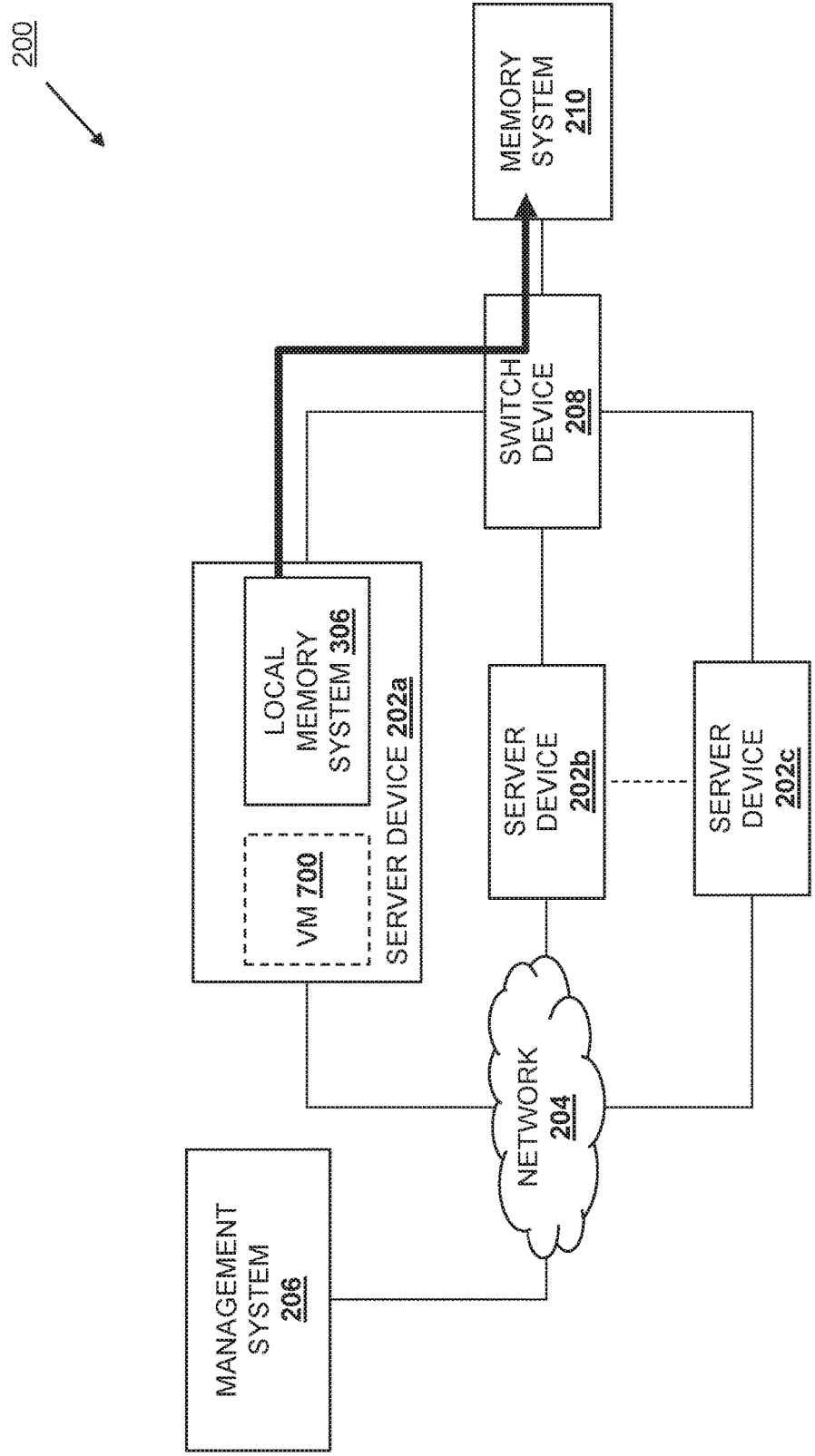
FIG. 7A is a schematic view illustrating an embodiment of server devices in the networked system of FIG. 2 operating during the method of FIG. 6.

The method 600 begins at block 602 where a live virtual machine migration is initiated. In an embodiment, at block 602, any or all of the processing systems 304 in their respective server devices 202a, 202b, and/or 202c may operate to provide a virtual machine or other application (e.g., via the execution of instructions on a local memory system 306 to which they are connected). With reference to FIG. 7A and for the purposes of the examples provided below, the processing system 304 in the server device 202a is illustrated as providing a Virtual Machine (VM) 700 (e.g., via the execution of instructions included on the local memory system 306 in the server device 202a). However, while one virtual machine is illustrated, one of skill in the art in possession of the present disclosure will recognize that any number of virtual machines may be deployed on the server device 202a, the server device 202b, and/or the server device 202c while remaining within the scope of the present disclosure as well.

In an embodiment, at block 602, the virtual machine 700 may include applications, threads, and/or other virtual machine/application components may be allocated a local memory area in the local memory system 306 of the server device 202a to store virtual machine data. As such, at block 602, the server device 202a may receive a virtual machine live migration instruction to migrate the virtual machine 700 to the server device 202b while the virtual machine 700 is running. For example, a virtual machine migration engine provided by the server device 202a or the management system 206 may provide the server device 202a the virtual machine live migration instruction to migrate the virtual machine 700 to the server device 202b, and the data tiering engine 310 in server device 202a may receive that instruction in block 602

The method 600 then proceeds to block 604 where virtual machine data for the first virtual machine is moved from the first local memory area in the local memory system that is included in the initiator host server device to a memory fabric memory area in the memory fabric memory system.

In an embodiment, at block 604 and continuing with the example in FIG. 7A, the data tiering engine 310 may begin moving virtual machine data for the virtual machine 700 from the local memory area in the local memory system 306 of the server device 202a to the memory fabric memory area in the memory fabric memory system (e.g., provided by the memory system 210/500). The virtual machine data may include data that the virtual machine accesses when operating and/or data that the processing system 304 accesses to provide the virtual machine. In a particular example, the data tiering engine 310 may move the virtual machine data at block 604 while the virtual machine 700 is operating on the server device 202a. As such, the virtual machine 700/processing system 304 may be provided by, and may access, a first portion of the virtual machine data in the local memory area in the local memory system 306, and may be provided by, and may access, a second portion of the virtual machine data in the memory fabric memory area in the memory fabric memory system 210/500 during the movement of first virtual machine data.

In various embodiments, prior to or in response to the virtual machine migration instruction, the switch memory fabric management subsystem 404 in the switch device 400 may operate to allocate different portions of the memory system 210/500 to the server device 202a, 202b, and/or 202c by, for example, communicating with the memory fabric management subsystem 508 in the memory system 210/500 via its communication subsystem in order to cause the media controller device 506 to provide allocations of memory system address space included in the memory device(s) 504 to the virtual machine 700, the server device 202a, the server device 202b, and/or the server device 202c.

In a specific example, Gen-Z ZMMUs may provide Gen-Z apertures for pages in the memory fabric that operate essentially as a page directory for the memory fabric that is managed/programmed by the memory fabric manager and advertised using the Gen-Z apertures, specific memory fabric resources, and memory regions. Furthermore, once mapped and advertised to a server device, the server device may discover the memory as part of its normal boot memory discovery process (e.g., using firmware and via an e820/ACPI table map), and provide its address region in the physical address space map for the server device, which allows that memory to be discovered by its operating system. As would be understood by one of skill in the art in possession of the present disclosure, the operating system memory manager may then allocate one or more virtual machines from various regions within the system physical address space, including the spaces discovered via the Gen-Z ZMMU apertures.

Furthermore, the switch memory fabric management subsystem 404 in the switch device 400 may store notational reference information about memory system portion allocations in the switch memory fabric management database 406, which may include, for example, reference pointers that map the virtual machine 700/server device 202a to a first portion of the memory system 210/500 and that map the server device 202b to a second portion of the memory system 210/400, page ownership information that provides the virtual machine 700/server device 202a ownership of the first portion of the memory system 210/500 and that provides the server device 202b ownership of the second portion of the memory system 210/500, and/or any other notational reference information that would be recognized by one of skill in the art in possession of the present disclosure as providing for the allocation of portions of a memory fabric memory system to threads.

Figure 7B:
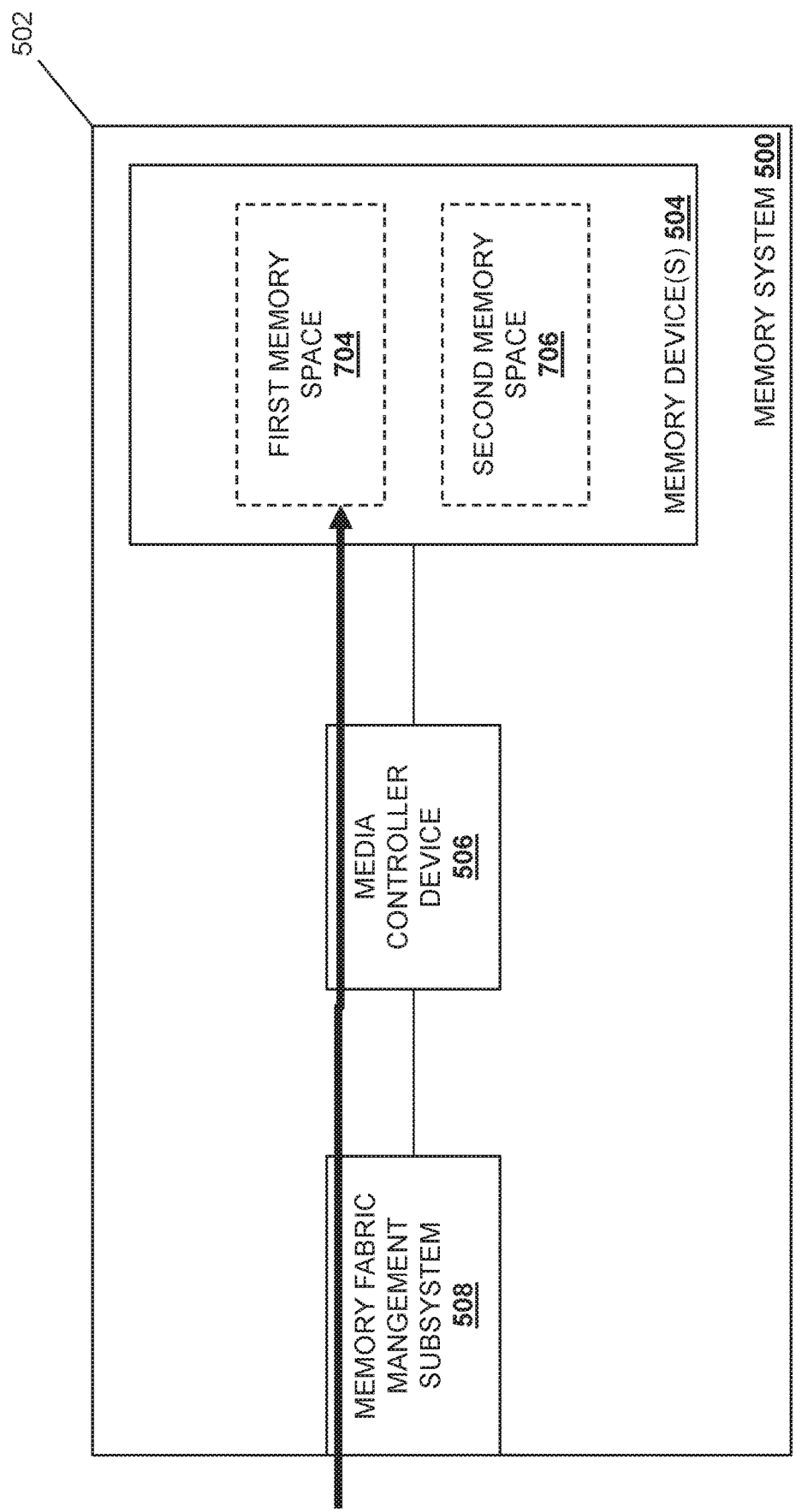
FIG. 7B is a schematic view illustrating an embodiment of the memory system of FIG. 5 operating during the method of FIG. 6.

With reference to FIG. 7B and for the purposes of the examples provided below, the virtual machine 700/server device 202a is illustrated as having been allocated a first memory space 704 (e.g., by the media controller device 506 in response to the communications between the switch memory fabric management subsystem 404 and the memory fabric management subsystems 508 as discussed above), and the server device 202b is illustrated as having been allocated a second memory space 706 (e.g., by the media controller device 506 in response to the communications between the switch memory fabric management subsystem 404 and the memory fabric management subsystems 508 as discussed above). As would be appreciated by one of skill in the art in possession of the present disclosure, the first memory space 704 and the second memory space 706 may be defined by different memory address ranges provided by the memory device(s) 504, different memory pages provided by the memory device(s) 504, and/or other different portions of the memory device(s) 504 that would be apparent to one of skill in the art in possession of the present disclosure. In the various examples, the first memory space 704 and the second memory space 706 may be equal size memory spaces or may be unequal size memory spaces. In other examples, only the first memory space 704 may be provided in the memory device(s) 504.

In an embodiment, at block 604, the data tiering engine 310 of the server device 202a may move the virtual machine data from the local memory area in the local memory system 306 to the first memory space 704 in the memory system 210/500 via the communication subsystem 312. Furthermore, as the data tiering engine 310 is moving the virtual machine data from the local memory system 306 to the first memory space 704, the data tiering engine 310 may maintain a migration map of virtual-machine-memory-addresses-to-physical-memory-addresses in the local memory area in the local memory system 306 of the server device 202a, and to the physical memory addresses in the first memory space 704, so that the virtual machine 700 and/or processing system 304 can access the virtual machine data from both the local memory area in the local memory system 306 and the first memory space 704 in the memory system 210/500.

In various embodiments, the data tiering engine 310 in the server device 202a may move the virtual machine data from the local memory area in local memory system 306 provided in the server device 202a to the first memory space 704 in the memory system 210/500 according to one or more tiering policies. For example, a tiering policy may include moving virtual machine data that is accessed least often by its associated processing system and/or virtual machine before moving the virtual machine data that accessed most often by its associated processing system and/or virtual machine. In many embodiments, accessing virtual machine data in the local memory system 306 is faster than accessing the virtual machine data in the memory system 210/500 and, as such, it may be beneficial to move the virtual machine data that is accessed the most from the local memory system 306 to the memory system 210/500 subsequent to the virtual machine data that is accessed the least. However, one of skill in the art in possession of the present disclosure will recognize that the data tiering engine 310 may move the virtual machine data from the local memory system 306 to the first memory space 704 in the memory system 210/500 according other tiering policies that would be apparent to one of skill in the art in possession of the present disclosure.

In various embodiments, the local memory area in the local memory system 306 provided in the server device 202a may be used as write-through cache. For example, the data tiering engine 310 may copy the virtual machine data from local memory area in the local memory system 306 of the server device 202a such that the virtual machine 700 may still perform read operations associated with the virtual machine data from the local memory area in the local memory system 306, and perform write operations by writing, via the data tiering engine 310, any new or changed virtual machine data to the local memory area in the local memory system 306 provided in the server device 202a, and writing that virtual machine data to the first memory space 704 in the memory system 210/500 as well. In some examples, the conversion of the local memory area in the local memory system 306 provided in the server device 202a to use as write-through cache may be performed as a dynamic operation as portions of the local memory area in the local memory system 306 are copied to the first memory space 704 in the memory system 210/500. In other examples, the virtual machine 700 may perform read operations from the local memory area in the local memory system 306 provided in the server device 202a via the data tiering engine 310 and while performing write operations to the first memory space 704 in the memory system 210/500, as well as reading the virtual machine data stored via write operations from the first memory space 704 in the memory system 210/500. While various examples of moving virtual machine data for the virtual machine 700 from the local memory area in the local memory system 306 provided in the server device 202a to the first memory space 704 in the memory system 210/500 are described, one of skill in the art will recognize that other mechanisms for moving virtual machine data from the local memory area in the local memory system 306 provided in the server device 202a to the first memory space 704 in the memory system 210/500 will fall within the scope of the present disclosure as well.

The method 600 then proceeds to decision block 606 where it is determined whether all of the virtual machine data has been moved from the local memory area in the local memory system of the initiator host server device to the memory fabric memory area in the memory fabric memory system. In an embodiment, at decision block 606, the data tiering engine 310 may monitor whether all of the virtual machine data for the virtual machine provided at the initiator host server device has been moved from the local memory system to the memory fabric memory area in the memory fabric memory system 210/500. Continuing with the above example illustrated in FIGS. 7A and 7B, the data tiering engine 310 and/or the virtual machine migration engine may monitor whether the virtual machine data for the virtual machine 700 has been moved from the local memory area in the local memory system 306 provided in the server device 202a to the first memory space 704 in the memory system 210/500. If the data tiering engine 310 has not moved all of the virtual machine data from the local memory area in the local memory system 306 provided in the server device 202a to the first memory space 704 in the memory system 210/500, the method 600 may loop through blocks 604 and 606 to continue to move the virtual machine data until all the virtual machine data has been moved.

When the data tiering engine 310 has moved all of the virtual machine data from the local memory area in the local memory system 306 provided in the server device 202a to the first memory space 704 in the memory system 210/500, then the method 600 may proceed to block 608 where operation of the virtual machine is stopped on the initiator host server device. In an embodiment, at block 608 and continuing with the example above, the virtual machine migration engine may stop the operation of the virtual machine 700 on the server device 202a. For example, the virtual machine engine provided by the management 206 and/or the server device 202a may halt, freeze, or otherwise stop the virtual machine 700 (e.g., by stopping the execution of virtual machine data/code by the processing system performing that execution).

The method 600 then proceeds to block 610 where virtual machine state information is copied to the target host server system. In an embodiment, at block 610 and continuing with the example above, the virtual machine migration engine may copy the virtual machine state information such as, for example, an execution state of a virtual machine processor providing the virtual machine 700 via the server device 202a, and provide that virtual machine state information to the server device 202b via the network 204.

Figure 8:
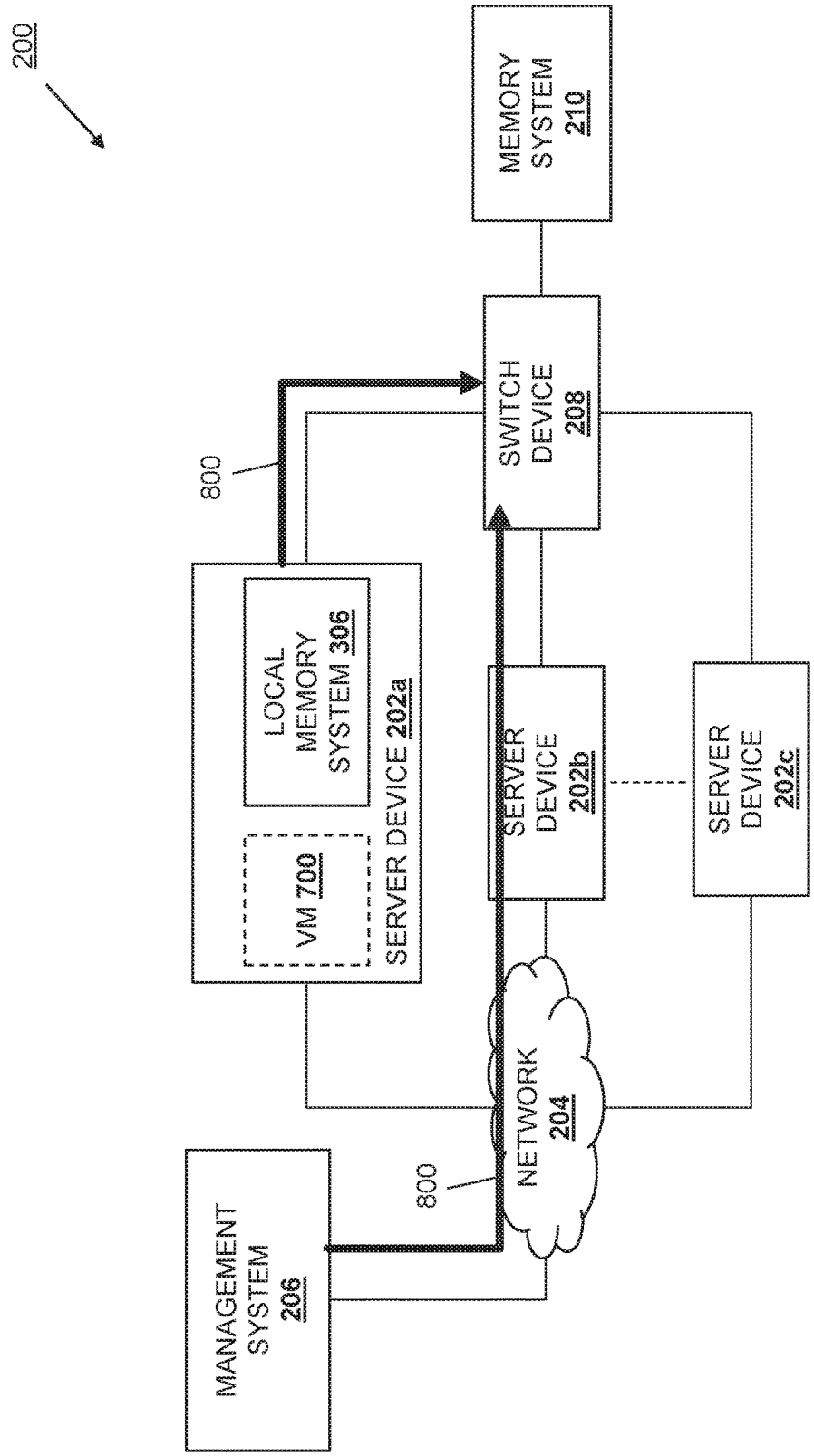
FIG. 8 is a schematic view illustrating an embodiment of the server devices in the networked system of FIG. 2 operating during the method of FIG. 6.

The method 600 then proceeds to block 612 where control of the memory fabric area in the memory fabric memory system that is storing the virtual machine data is transferred from the initiator host server device to the target host server device. In an embodiment, at block 512, the switch device 208 may operate to identify requests to "transfer" the virtual machine data that is stored in the memory fabric memory system. Continuing with the example provided above and with reference to FIG. 8, the communication subsystem 408 in the switch device 208/400 may receive a request 800 from the virtual machine migration engine to transfer the virtual machine data from being controlled by the initiator host server device to the target host server device. In some embodiments, the switch memory fabric management subsystem 404 may receive the request 800 and/or be configured to snoop communications transmitted by the virtual machine migration engine. For example, with reference to FIG. 9, during the process of conventional subsystems in the switch device 400 performing conventional switching operations on the request 800, the switch memory fabric management subsystem 404 may operate to performing snooping operations 900 on the request 800 to transfer virtual machine data that was transmitted by the server device 202a and, in response, may identify the server device 202b to which the data is to-be transferred, data address(es) for the data to-be transferred, data references for the data to-be transferred, and/or any other data transfer information that would be apparent to one of skill in the art in possession of the present disclosure. However, while a specific example of the reception and/or identification of requests to transfer data have been described, one of skill in the art in possession of the present disclosure will recognize that requests to transfer data may be received and/or identified in a variety of manners that will fall within the scope of the present disclosure as well.

Figure 9:
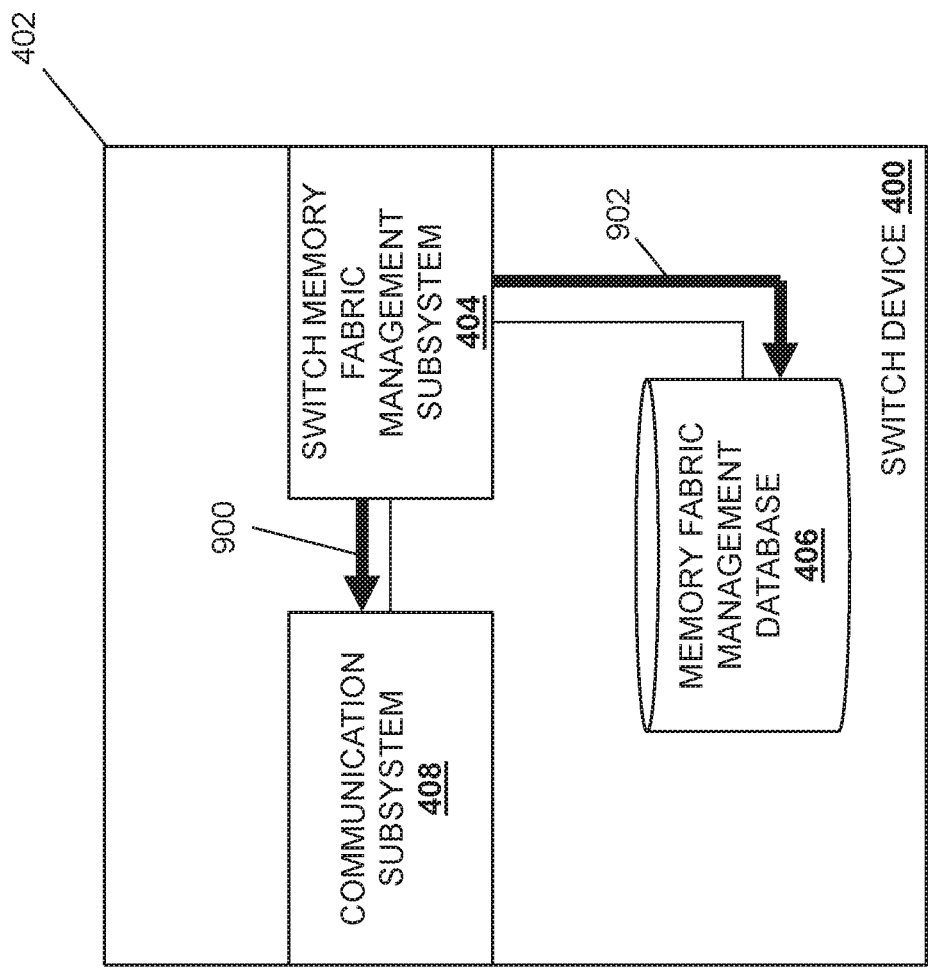
FIG. 9 is a schematic view illustrating an embodiment of the switch device of FIG. 4 operating during the method of FIG. 6.

In response to the request and/or to the stopping of the operation of the first virtual machine on the server device 202a, the switch device 400 may modify notational reference information to disassociate the memory fabric memory area (e.g., the first memory space 704) provided in the memory system 210/500 and the virtual machine 700/server device 202a, and associate the memory fabric memory area (e.g., the first memory space 704) provided in the memory system 210/500 with the sever device 202b. In an embodiment, the switch memory fabric management subsystem 404 in the switch device 400 may operate to access the switch memory fabric management database 406 and perform notational reference information modification operations 902 in the switch memory fabric management database 406, as illustrated in FIG. 9. In an embodiment, the notational reference information modification operations 902 may be performed on the notational reference information that is associated with the memory system portion allocations and that was stored in the switch memory fabric management database 406 which, as discussed above, may include reference pointers that map the virtual machine data associated with the virtual machine 700/server device 202a to the first memory space 704 in the memory device(s) 504 included in the memory system 210/500 and that, in an optional embodiment, map the server device 202b to the second memory space 706 in the memory device(s) 504 included in the memory system 210/500, may include page ownership information that provides the server device 202a ownership of the first memory space 704 in the memory device(s) 504 included in the memory system 210/500 and that provides the server device 202b ownership of the second memory space 706 in the memory device(s) 504 included in the memory system 210/500, and/or any other notational reference information that would be recognized by one of skill in the art in possession of the present disclosure as providing for the allocation of portions of the memory fabric memory system to threads.

For example, the modification of the notational reference information in the switch memory fabric management database 406 may include the switch memory fabric management subsystem 404 in the switch device 400 disassociating the virtual machine 700/server device 202a from the first memory space 704 that it was allocated in the memory device(s) 504 included in the memory system 210/500, and associating the server device 202b with the first memory space 704 in the memory device(s) 504 included in the memory system 210/500. In a specific example, the disassociation of the server device 202a from the first memory space 704 and the association of the server device 202b with the first memory space 704 may include changing a reference pointer that maps the server device 202a to the first memory space 704 such that that reference pointer maps the server device 202b to the first memory space 704, and changing page ownership information that provides the server device 202a ownership of the first memory space 704 such that the server device 202b owns the first memory space 704. However, while specific notational reference information modification operations have been described, one of skill in the art in possession of the present disclosure will recognize that the first memory space 704 may be disassociated with the server device 202a and associated with the server device 202b in a variety of manners that will fall within the scope of the present disclosure as well.

Similarly, in an optional embodiment, the modification of the notational reference information in the switch memory fabric management database 406 may include the switch memory fabric management subsystem 404 in the switch device 400 disassociating the server device 202b from the second memory space 706 that it was allocated in the memory device(s) 504 included in the memory system 210/500, and associating the server device 202a with the second memory space 706 in the memory device(s) 504 included in the memory system 210/500. In a specific example, the disassociation of the server device 202b from the second memory space 706 and the association of the server device 202a with the second memory space 706 may include changing a reference pointer that maps the server device 202b to the second memory space 706 such that that reference pointer maps the server device 202a to the second memory space 706, and changing page ownership information that provides the server device 202b ownership of the second memory space 706 such that the server device 202a owns the second memory space 706. However, while specific notational reference information modification operations have been described, one of skill in the art in possession of the present disclosure will recognize that the second memory space 706 may be disassociated with the server device 202*b* and associated with the server device 202*a* in a variety of manners that will fall within the scope of the present disclosure as well.

Figure 10:
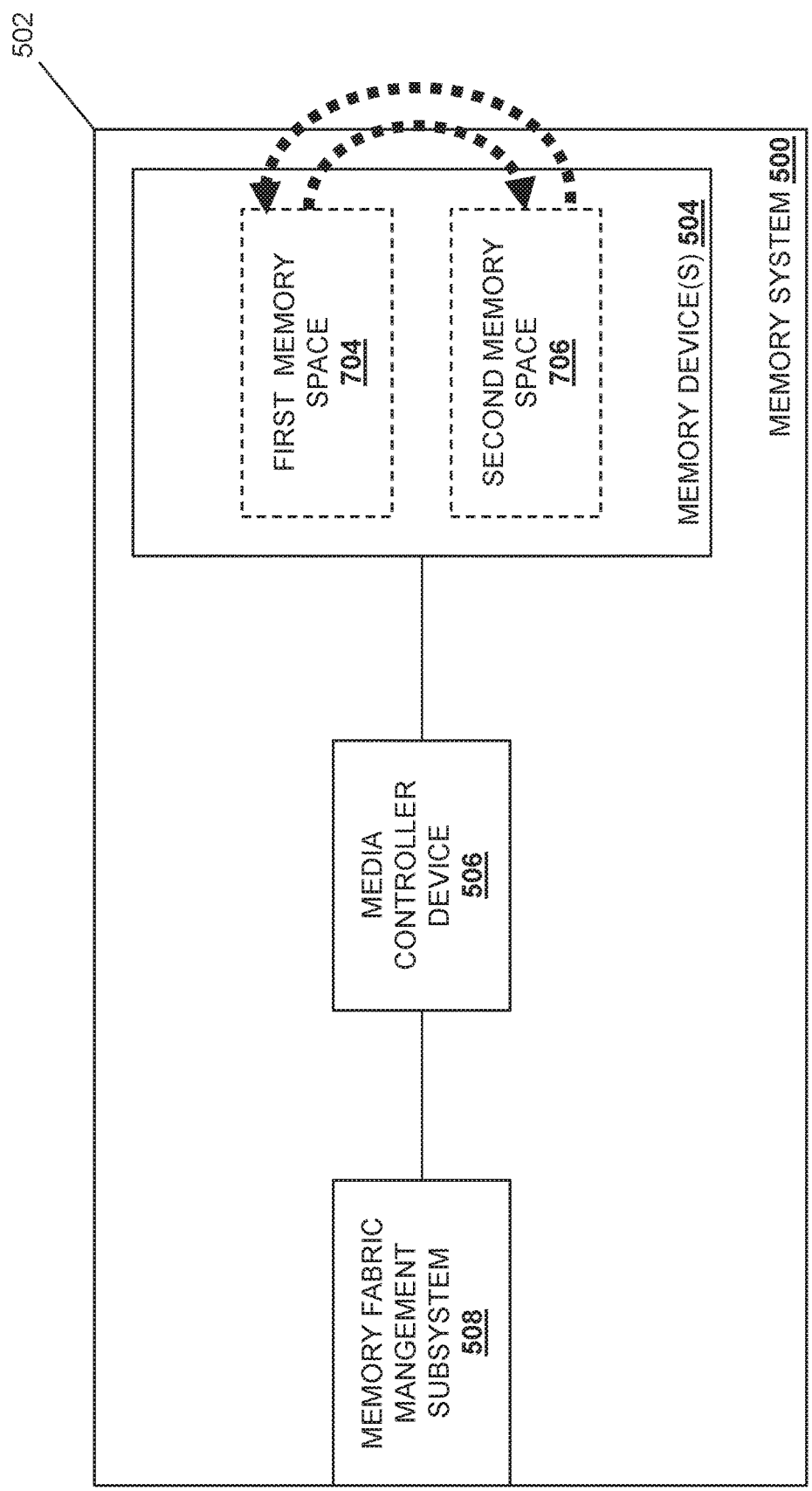
FIG. 10 is a schematic view illustrating an embodiment of the memory system of FIG. 5 operating during the method of FIG. 6.

As will be appreciated by one of skill in the art in possession of the present disclosure, the notational reference information modification may be performed at substantially the same time and/or as part of similar operations such that the first memory space 704 and the second memory space 706 in the memory device(s) 504 in the memory system 210/500 have their allocations (i.e., to the server devices 202*a* and 202*b*, respectively) "swapped", as illustrated in FIG. 10 (which one of skill in the art in possession of the present disclosure will recognize is accomplished entirely by the modifications of the notational reference information in the switch memory fabric management database 406, and does not require data movement actions to be performed within the memory system 210/500.) As such, the swapping of reference pointers is provided in the switch memory fabric management database 406 that map the server device 202*a* to the first memory space 704 and that map the server device 202*b* to the second memory space 706 such that the server device 202*a* is mapped to the second memory space 706 and the server device 202*b* is mapped to the first memory space 704, and the swapping of page ownership information that provides the server device 202*b* ownership of the first memory space 704 and that provides the server device 202*a* ownership of the second memory space 706 such that the server device 202*a* owns the second memory space 706 and the server device 202*b* owns the first memory space 704. However, while a specific example of the swapping of memory space allocations having equal sizes has been described, one of skill in the art in possession of the present disclosure will recognize that different sized memory spaces may be swapped in other embodiments. Furthermore, in some embodiments, the initiator host server device of the virtual machine (e.g., the server device 202*a* in the examples below) ends up losing allocated memory as part of the notational reference information modification data "transfer", and without swapping memory allocations.

Figure 11A:
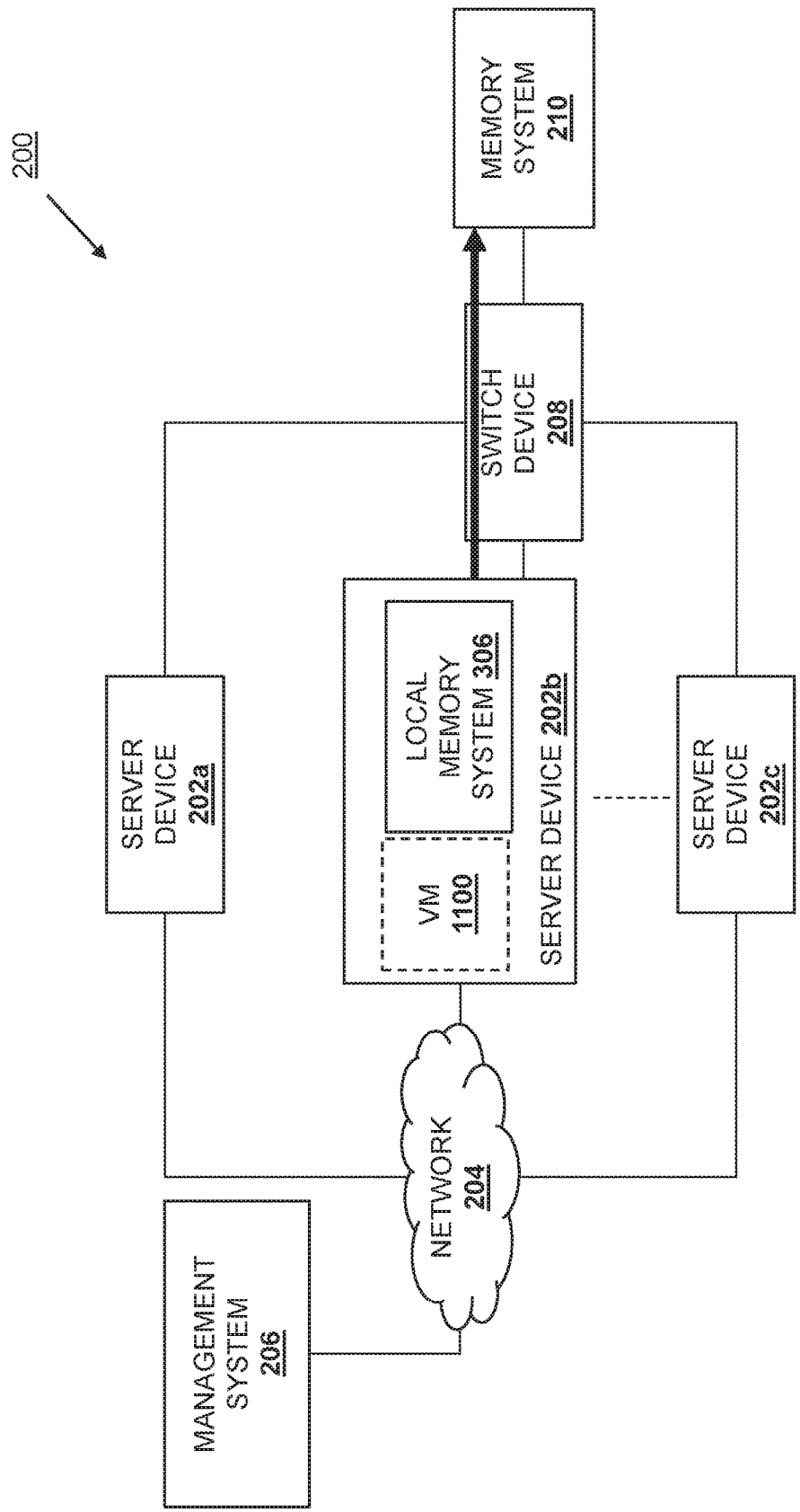
FIG. 11A is a schematic view illustrating an embodiment of a server device in the networked system of FIG. 2 operating during the method of FIG. 6.

The method 600 then proceeds to block 614 where the virtual machine is restarted on the target host server device. In an embodiment, at block 614 and with reference to FIG. 11A, the virtual machine migration engine of the management system 206 and/or server device 202*b* may restart the virtual machine 700 as virtual machine 1100 via the hypervisor in the server device 202*b*. For example, the virtual machine 1100 may be restarted using the virtual machine state information received in block 610 and the virtual machine data that is stored in the memory fabric memory area in the memory fabric memory system 210/500 (e.g., the first memory space 704). As such, the virtual machine 1100 may now be provided by and/or access the data in the first memory space 704 via, for example, request/respond operations, and provides a migrated version of the virtual machine 700. FIG. 11A illustrates the virtual machine 1100 generating and transmitting a memory load instruction via the processing system 304 in the server device 202*a* and through the switch device 208 such that it is received by the switch memory fabric management subsystem 404 in the switch device 208/400 (e.g., via the communication subsystem 408), with that memory load instruction requesting the virtual machine data "transferred" by the virtual machine 700 as discussed above.

Figure 11B:
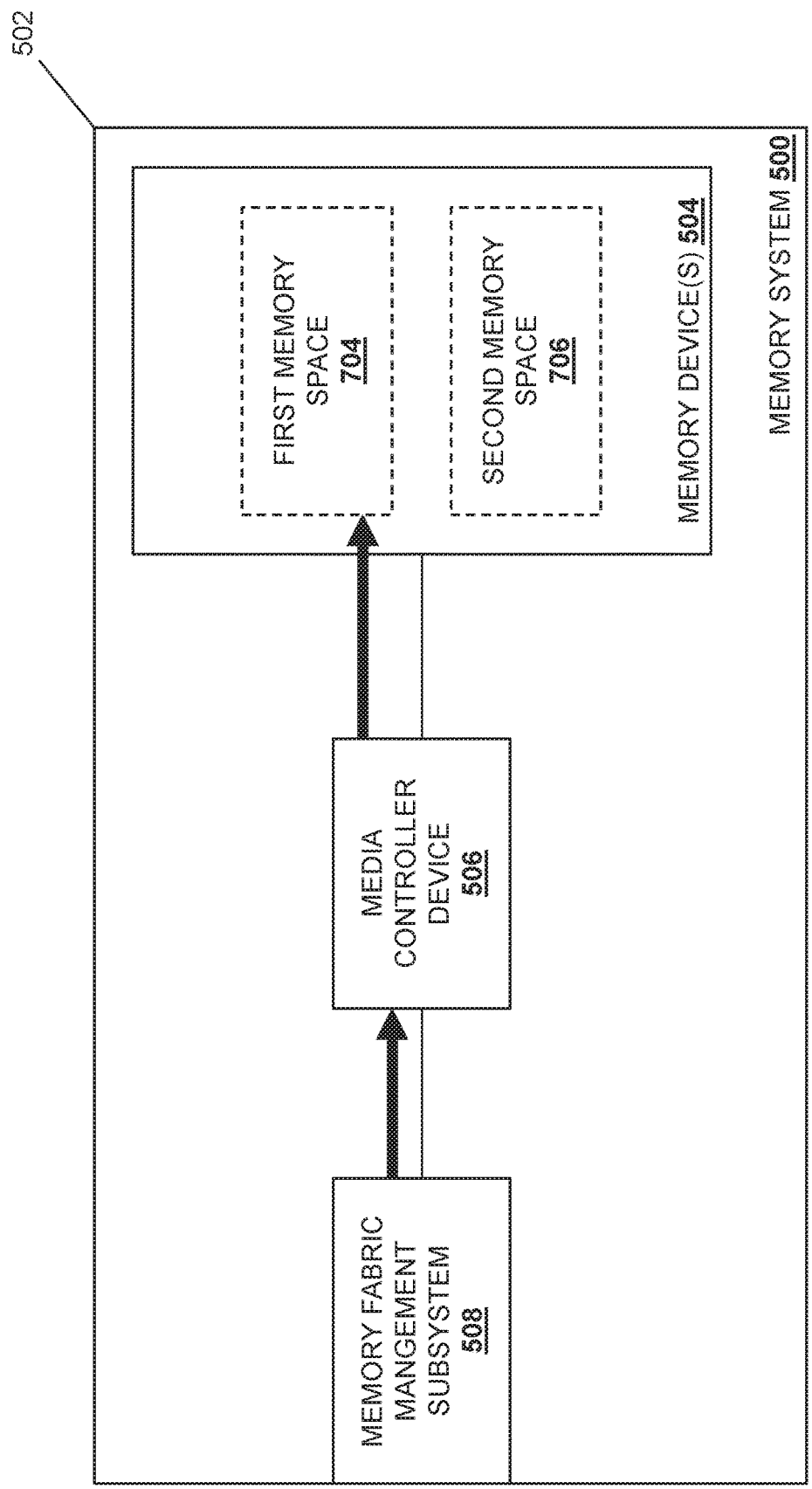
FIG. 11B is a schematic view illustrating an embodiment of the memory system of FIG. 5 operating during the method of FIG. 6.
Figure 11C:
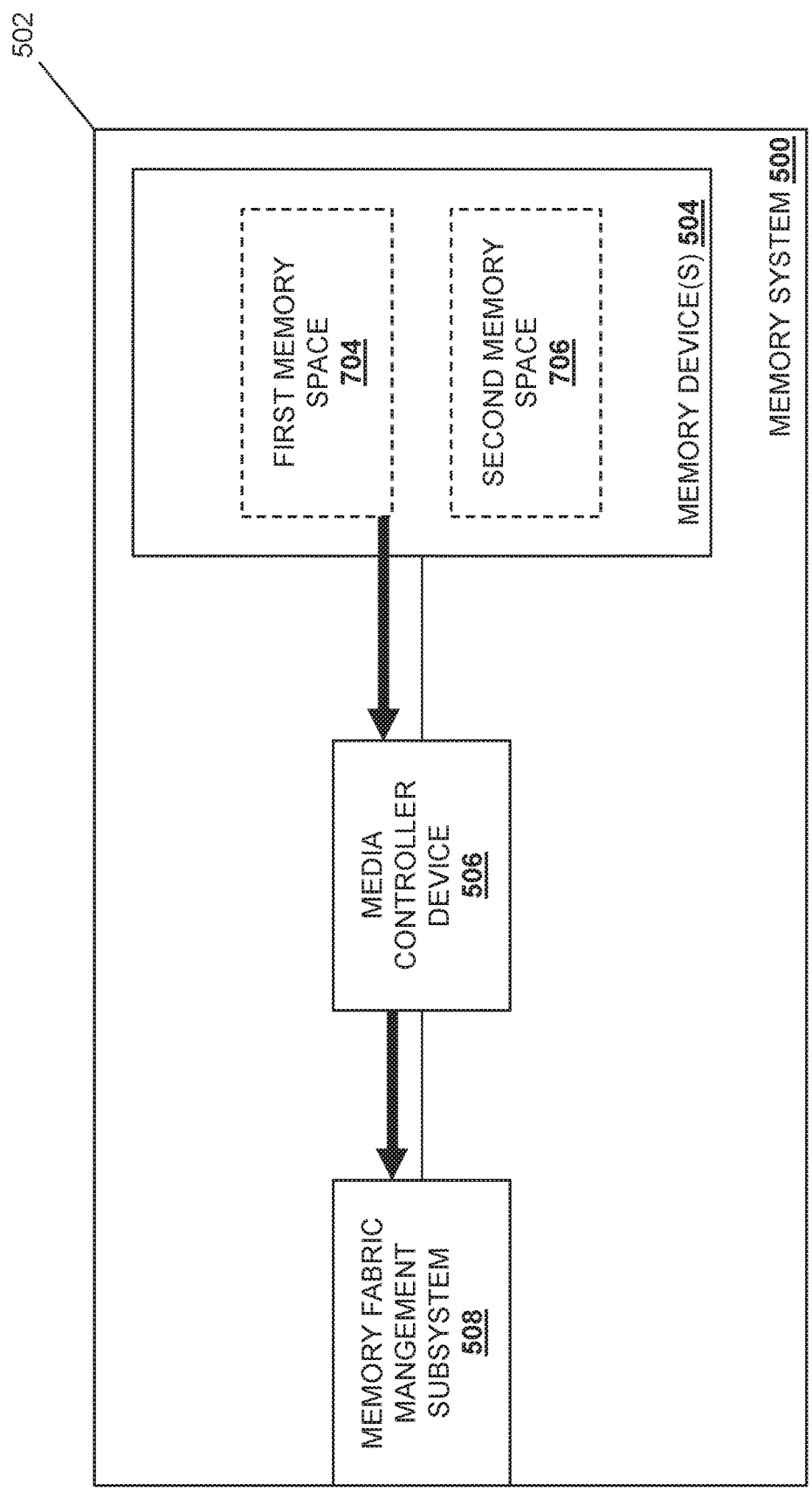
FIG. 11C is a schematic view illustrating an embodiment of the memory system of FIG. 5 operating during the method of FIG. 6.
Figure 11D:
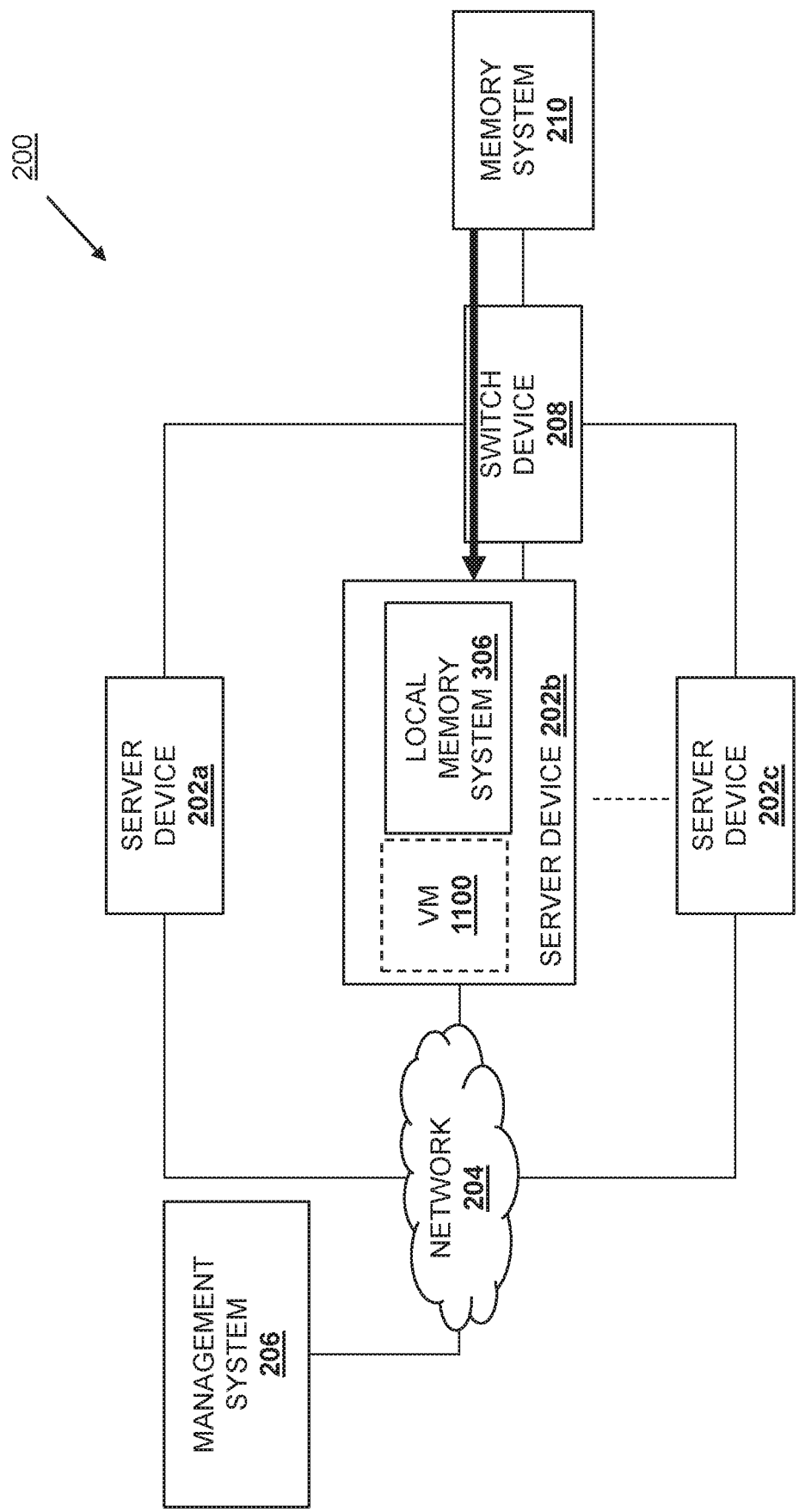
FIG. 11D is a schematic view illustrating an embodiment of a server device in the networked system of FIG. 2 operating during the method of FIG. 6.

The switch memory fabric management subsystem 404 may then act as a memory fabric requester (e.g., a Gen-Z requester) and utilize the notation reference information in the switch memory fabric management database 406 to generate a memory fabric request (e.g., a Gen-Z request) that is transmitted via the communication subsystem 408 to the memory system 210. As illustrated in FIGS. 11B and 11C, the memory fabric management subsystem 508 may act as a memory fabric responder (e.g., a Gen-Z responder) and retrieve the data via the media controller device 506 and from the first memory space 704 in the memory device(s) 504, generate a memory fabric response (e.g., a Gen-Z response) that includes the data retrieved from the first memory space 704 as its payload, and transmit that memory fabric response through the switch device 208. FIG. 11D illustrates how the memory fabric management subsystem 404 in the switch device 206/400 may receive the memory fabric response and act as a memory fabric requester to load the data retrieved from the first memory space 704 in a local memory system 306 of the server device 202*b* that is providing the virtual machine 1100. However, while a specific example of the accessing of data in the first portion of the memory system by the virtual machine 1100 of the server device 202*b* has been described, one of skill in the art in possession of the present disclosure will recognize that data transferred via the notational reference information modifications described herein may be accessed in a variety of manners that will fall within the scope of the present disclosure as well.

Figure 12:
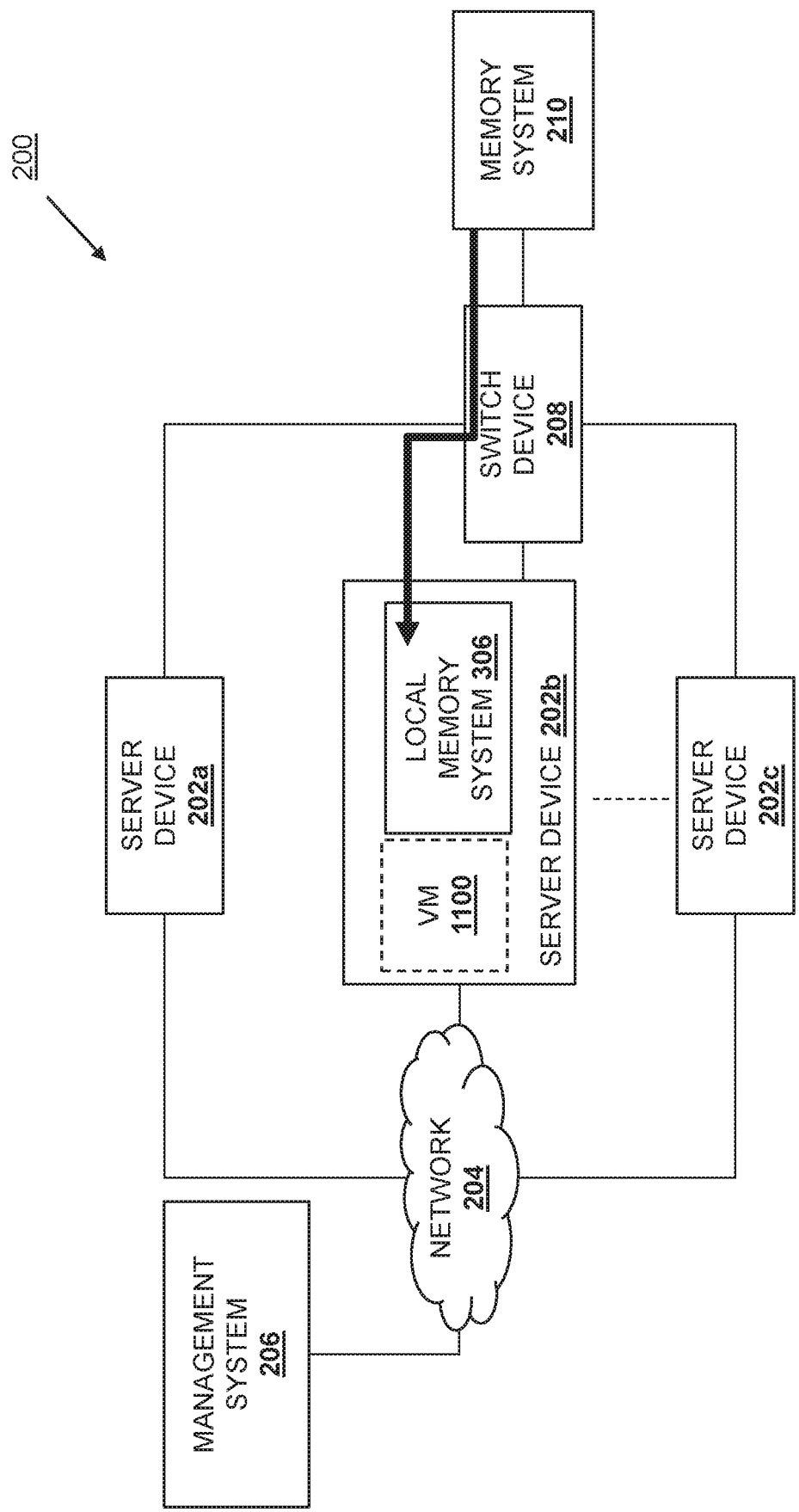
FIG. 12 is a schematic view illustrating an embodiment of a server device in the networked system of FIG. 2 operating during the method of FIG. 6.

The method 600 then proceeds to block 616 where the first virtual machine data is moved from the memory fabric memory area in the memory fabric memory system to a second local memory area in a second local memory system that is included in the target host server device. In an embodiment, at block 616 and with reference FIG. 12, the data tiering engine 310 in the server device 202*b* may begin moving virtual machine data from the memory fabric memory area (e.g., the first memory space 704) in the memory fabric memory system 210/500 to the local memory area in the local memory system 306 provided in the server device 202*b*. In particular examples, the data tiering engine 310 may move the virtual machine data while the virtual machine 1100 is operating on the server device 202*b*. As such, the virtual machine 1100 and/or the processing system 304 of the server device 202*b* may be provided by/access a portion of the virtual machine data in the local memory area in the local memory system 306 of the server device 202*b*, as well as be provided by/access a portion of the virtual machine data in the memory fabric memory area in the memory fabric memory system 210/500 during the movement of virtual machine data.

In an embodiment, at block 616, the data tiering engine 310 of the server device 202*b* may move the virtual machine data from the first memory space 704 in the memory system 210/500 and via the communication subsystem 312 to the local memory area in the local memory system 306 provided in the server device 202*b*. As the data tiering engine 310 is moving the virtual machine data from the first memory space 704 to the local memory system 306 provided in the server device 202*b*, the data tiering engine 310 may maintain a migration map of virtual-machine-memory-addresses-to-physical-memory-addresses in the local memory area in the local memory system 306 provided in the server device 202*b*, and to the physical memory addresses in the first memory space 704, so that the virtual machine 1100 can access the virtual machine data from both the local memory system 306 provided in the server device 202*b* and the first memory space 704 in the memory system 210/500. in an embodiment, when all of the virtual machine data has been moved from the first memory space 704 to the local memory area in the local memory system 306 provided in the server device 202b, the virtual machine 1100 may then operate using the virtual machine data that is stored at the local memory system 306 of the server device 202b.

Thus, systems and methods have been described that provide for live migration of a virtual machine while avoiding multiple copies and virtual machine stoppages that are required in conventional virtual machine live migration, which may be accomplished by moving virtual machine data stored locally in a local memory system to a memory fabric memory system such that the virtual machine that is to-be migrated may still access the virtual machine data from both the local memory system and the memory fabric memory system. Once all of the virtual machine data has been transferred to the memory fabric memory system, the virtual machine may be frozen on an initiator host server device, and its state information may be copied to a target host server device. A memory fabric memory area in the memory fabric memory system on which the virtual machine data is stored may then be disassociated from the virtual machine/initiator host server device, and associated with the target host server device. The virtual machine may then be restarted on the target host server device using the virtual machine data in the memory fabric memory space and the state information. The target host server device may then move the virtual machine data from the memory fabric memory space to the local memory system of the target host server device. As such, more efficient virtual machine live migration is provided that eliminates the need to perform multiple freezes and snapshots of a virtual machine when performing convention live migration of that virtual machine, while providing the effect of such data movement by notational reference modifications that reallocate portions of the memory fabric, resulting in less downtime for the virtual machine that is being migrated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual machine migration system, comprising:
 a target host computing device;
 a memory fabric memory system that is coupled to the target host computing device;
 an initiator host computing device that is coupled to the memory fabric memory system and the target host computing device, wherein the initiator host computing device provides a first virtual machine and is configured to:
  receive a live virtual machine migration instruction to migrate the first virtual machine to the target host computing device;
  move, while the first virtual machine is operating on the initiator host computing device, first virtual machine data for the first virtual machine from a first local memory area in a local memory system that is included in the initiator host computing device to a memory fabric memory area in the memory fabric memory system, wherein a first portion of the first virtual machine data in the first local memory area in the local memory system and a second portion of the first virtual machine data in the memory fabric memory area in the memory fabric memory system are accessible to the first virtual machine and the initiator host computing device during the movement of the first virtual machine data; and
  stop, in response to all of the first virtual machine data being moved to the memory fabric memory area in the memory fabric memory system, operation of the first virtual machine on the initiator host computing device.

2. The system of claim 1, wherein the memory fabric memory system is configured to:
 disassociate, in response to the stopping operation of the first virtual machine on the initiator host computing device, the memory fabric memory area in the memory fabric memory system and the initiator host computing device; and
 associate the memory fabric memory area in the memory fabric memory system with the target host computing device.

3. The system of claim 2, wherein the disassociation of the memory fabric memory area in the memory fabric memory system and the initiator host computing device and the association of the memory fabric memory area in the memory fabric memory system with the target host computing device includes:
 changing page ownership that provides the target host computing device ownership of the memory fabric memory area in the memory fabric memory system.

4. The system of claim 1, wherein the target host computing device is configured to:
 receive a virtual machine state of the first virtual machine; and
 operate, according to the virtual machine state and using the first virtual machine data stored in the memory fabric memory area in the memory fabric memory system, a second virtual machine that is a migrated version of the first virtual machine.

5. The system of claim 4, wherein the target host computing device is configured to:
 move the first virtual machine data from the memory fabric memory area in the memory fabric memory system to a second local memory area in a second local memory system that is included in the target host computing device, wherein a third portion of the first virtual machine data in the memory fabric memory area in the memory fabric memory system and a fourth portion of the first virtual machine data in the second local memory area in the second local memory system are accessible to the second virtual machine and the target host computing device during the movement of the first virtual machine data from the memory fabric memory area in the memory fabric memory system to the second local memory area in the second local memory system.

6. The system of claim 5, wherein the target host computing device is configured to:
 operate the second virtual machine using the first virtual machine data that was moved to the second local memory area.

7. The system of claim 1, wherein the initiator host computing device is configured to:
 write, during the movement of the first virtual machine data for the first virtual machine from the first local memory area in the local memory system to the memory fabric memory area in the memory fabric memory system, additional first virtual machine data to the first local memory area in the local memory system and the memory fabric memory area in the memory fabric memory system; and
read, during the movement of the first virtual machine data, the first virtual machine data for the first virtual machine from the first local memory area of the local memory system.

8. An Information Handling System (IHS), comprising:
a processing system; and
a memory system that is coupled to the processing system and that includes instructions that, when executed by the processing system, cause the processing system to provide a hypervisor engine that is configured to:
operate a first virtual machine on the processing system;
receive a live virtual machine migration instruction to migrate the first virtual machine to a target host computing device;
move, while the first virtual machine is operating on the processing system, first virtual machine data for the first virtual machine from a first local memory area in the memory system to a first memory fabric memory area in a memory fabric memory system, wherein a first portion of the first virtual machine data in the first local memory area in the memory system and a second portion of the first virtual machine data in the first memory fabric memory area in the memory fabric memory system are accessible to the first virtual machine and the processing system during the movement of the first virtual machine data; and
stop, in response to all of the first virtual machine data being moved to the first memory fabric memory area in the memory fabric memory system, operation of the first virtual machine on the processing system.

9. The IHS of claim 8, wherein the stopping operation of the first virtual machine on the processing system causes the memory fabric memory system to:
disassociate the first memory fabric memory area in the memory fabric memory system and the processing system; and
associate the first memory fabric memory area in the memory fabric memory system with the target host computing device.

10. The IHS of claim 9, wherein the disassociation of the first memory fabric memory area in the memory fabric memory system and the processing system and the association of the first memory fabric memory area in the memory fabric memory system with the target host computing device includes:
changing page ownership that provides the target host computing device ownership of the first memory fabric memory area in the memory fabric memory system.

11. The IHS of claim 8, wherein the hypervisor engine is configured to:
receive a second virtual machine state of a second virtual machine; and
operate, according to the second virtual machine state and using second virtual machine data stored in a second memory fabric memory area in the memory fabric memory system, a third virtual machine that is a migrated version of the second virtual machine that was on an initiator host computing device.

12. The IHS of claim 11, wherein the hypervisor engine is configured to:

move the second virtual machine data from the second memory fabric memory area in the memory fabric memory system to a second local memory area in the memory system, wherein a first portion of the second virtual machine data in the second memory fabric memory area in the memory fabric memory system and a second portion of the second virtual machine data in the second local memory area in the memory system are accessible to the third virtual machine and the processing system during the movement of the second virtual machine data from the second memory fabric memory area in the memory fabric memory system to the second local memory area in the memory system.

13. The IHS of claim 12, wherein the hypervisor engine is configured to:
operate the third virtual machine using the second virtual machine data that was moved to the second local memory area.

14. The IHS of claim 8, wherein the hypervisor engine is configured to:
write, during the movement of the first virtual machine data for the first virtual machine from the first local memory area in the memory system to the first memory fabric memory area in the memory fabric memory system, additional first virtual machine data to the first local memory area in the memory system and the first memory fabric memory area in the memory fabric memory system; and
read, during the movement of the first virtual machine data, the first virtual machine data for the first virtual machine from the first local memory area of the memory system.

15. A method for virtual machine migration, comprising:
receiving, by an initiator host computing device, a live virtual machine migration instruction to migrate a first virtual machine operating on the initiator host computing device to a target host computing device;
moving, by the initiator host computing device while the first virtual machine is operating on the initiator host computing device, first virtual machine data for the first virtual machine from a first local memory area in a local memory system that is included in the initiator host computing device to a memory fabric memory area in a memory fabric memory system, wherein a first portion of the first virtual machine data in the first local memory area in the local memory system and a second portion of the first virtual machine data in the memory fabric memory area in the memory fabric memory system are accessible to the first virtual machine and the initiator host computing device during the movement of the first virtual machine data; and
stopping, by the initiator host computing device and in response to all of the first virtual machine data being moved to the memory fabric memory area in the memory fabric memory system, operation of the first virtual machine on the initiator host computing device.

16. The method of claim 15, further comprising:
disassociating, by the memory fabric memory system and in response to the stopping operation of the first virtual machine on the initiator host computing device, the memory fabric memory area in the memory fabric memory system and the initiator host computing device; and
associating, by the memory fabric memory system, the memory fabric memory area in the memory fabric memory system with the target host computing device.

17. The method of claim 16, wherein the disassociation of the memory fabric memory area in the memory fabric memory system and the initiator host computing device and the association of the memory fabric memory area in the memory fabric memory system with the target host computing device includes:

changing, by the memory fabric memory system, page ownership that provides the target host computing device ownership of the memory fabric memory area in the memory fabric memory system.

18. The method of claim 15, further comprising:

receiving, by the target host computing device, a virtual machine state of the first virtual machine; and operating, by the target host computing device and according to the virtual machine state and using the first virtual machine data stored in the memory fabric memory area in the memory fabric memory system, a second virtual machine that is a migrated version of the first virtual machine.

19. The method of claim 18, further comprising:

moving, by the target host computing device, the first virtual machine data from the memory fabric memory area in the memory fabric memory system to a second local memory area in a second local memory system that is included in the target host computing device, wherein a third portion of the first virtual machine data in the memory fabric memory area in the memory fabric memory system and a fourth portion of the first virtual machine data in the second local memory area in the second local memory system are accessible to the second virtual machine and the target host computing device during the movement of the first virtual machine data from the memory fabric memory area in the memory fabric memory system to the second local memory area in the second local memory system.

20. The method of claim 19, wherein the target host computing device is configured to:

operating, by the target host computing device, the second virtual machine using the first virtual machine data that was moved to the second local memory area.

* * * * *